US012429058B2

(12) United States Patent
Honda et al.

(10) Patent No.: US 12,429,058 B2
(45) Date of Patent: Sep. 30, 2025

(54) PURGE APPARATUS AND PURGE METHOD

(71) Applicant: EBARA CORPORATION, Tokyo (JP)

(72) Inventors: Shuichiro Honda, Tokyo (JP); Tetsuji Kasatani, Tokyo (JP); Hayato Ikeda, Tokyo (JP); Mitsutaka Iwami, Tokyo (JP); Kei Wataji, Tokyo (JP); Hyuga Kikuchi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 61 days.

(21) Appl. No.: 18/682,528

(22) PCT Filed: Aug. 9, 2022

(86) PCT No.: PCT/JP2022/030387
§ 371 (c)(1),
(2) Date: Feb. 9, 2024

(87) PCT Pub. No.: WO2023/022062
PCT Pub. Date: Feb. 23, 2023

(65) Prior Publication Data

US 2024/0360832 A1 Oct. 31, 2024

(30) Foreign Application Priority Data

Aug. 17, 2021 (JP) ................................ 2021-132902

(51) Int. Cl.
*F04D 13/08* (2006.01)
*F04D 7/00* (2006.01)
*F04D 19/04* (2006.01)

(52) U.S. Cl.
CPC ............... *F04D 13/08* (2013.01); *F04D 7/00* (2013.01); *F04D 19/04* (2013.01); *F17C 2227/0135* (2013.01)

(58) Field of Classification Search
CPC ...... F17C 2227/0135; F17C 2227/0178; F04D 7/00; F04B 1/0443; F04B 53/04
(Continued)

(56) References Cited

U.S. PATENT DOCUMENTS 4,080,106 A * 3/1978 Haesloop ............. F04D 29/086
222/333
4,435,132 A 3/1984 Haesloop et al.
2008/0134977 A1 6/2008 Nakashima et al.

FOREIGN PATENT DOCUMENTS

JP S50-030281 B1 9/1975
JP S52-087701 A 7/1977
(Continued)

OTHER PUBLICATIONS

International Search Report issued in Patent Application No. PCT/JP2022/030387 dated Nov. 1, 2022.

*Primary Examiner* — Kenneth J Hansen
(74) *Attorney, Agent, or Firm* — Chrisman Gallo Tochtrop LLC

(57) ABSTRACT

A purge apparatus is provided. The purge apparatus is capable of preventing air from being entrained when a submersible pump is moved into a pump column, and capable of warming the submersible pump when the submersible pump is removed from the pump column to thereby prevent component of the air from being liquefied, thus preventing the liquefied gas from being emitted in the atmosphere. The purge apparatus includes a hermetic purge container configured to accommodate the submersible pump therein; a vacuum line coupled to the hermetic purge container and coupled to a vacuum source; a purge-gas supply line coupled to the hermetic purge container and coupled to a purge-gas supply source; and a purge-gas supply valve mounted to the purge-gas supply line.

20 Claims, 16 Drawing Sheets

(58) Field of Classification Search
USPC .................................................. 62/50.5, 55.5
See application file for complete search history.

(56) References Cited

FOREIGN PATENT DOCUMENTS

| | | | |
|---|---|---|---|
| JP | S57-137684 | A | 8/1982 |
| JP | 2000-033992 | A | 2/2000 |
| JP | 2000-120992 | A | 4/2000 |
| JP | 3197645 | B2 | 8/2001 |
| JP | 3198248 | B2 | 8/2001 |
| JP | 3472379 | B2 | 12/2003 |
| JP | 2008-078285 | A | 4/2008 |
| WO | 2006/049055 | A1 | 5/2006 |

* cited by examiner

PURGE APPARATUS AND PURGE METHOD

TECHNICAL FIELD

The present invention relates to a purge apparatus and a purge method of exposing a submersible pump for pressurizing a liquefied gas, such as liquefied ammonia, liquefied natural gas (LNG), or liquid hydrogen, to purge gas.

BACKGROUND ART

Natural gas is widely used for thermal power generation and used as a raw material for chemicals. Furthermore, ammonia and hydrogen are expected to be energies that do not generate carbon dioxide that causes global warming. Applications of hydrogen as an energy include fuel cell and turbine power generation. Natural gas, ammonia, and hydrogen are in a gaseous state at normal temperature, and therefore natural gas, ammonia, and hydrogen are cooled and liquefied for their storage and transportation. Liquefied gas, such as liquefied natural gas (LNG), liquefied ammonia, and liquefied hydrogen, is temporarily stored in a liquefied-gas storage tank and then delivered to a power plant, factory, or the like by a pump.

FIG. 16 is a schematic view showing a conventional example of a liquefied-gas storage tank in which liquefied gas is stored and a pump for pumping up the liquefied gas. A pump 500 is installed in a vertical pump column 505 disposed in a liquefied-gas storage tank 501. An inside of the pump column 505 is filled with the liquefied gas, and the entire pump 500 is immersed in the liquefied gas. The pump 500 is thus a submersible pump that can operate in the liquefied gas. When the pump 500 is operated, the liquefied gas in the liquefied-gas storage tank 501 is sucked into the pump column 505, ascends in the pump column 505, and is discharged from the pump column 505 through a liquefied-gas discharge port 509.

CITATION LIST

Patent Literature

Patent document 1: Japanese Patent No. 3197645
Patent document 2: Japanese Patent No. 3198248
Patent document 3: Japanese Patent No. 3472379

SUMMARY OF INVENTION

Technical Problem

The pump 500 is a machine that contains consumables, and therefore the pump 500 requires regular maintenance. When the pump 500 is installed in the pump column 505 for the first time and when the pump 500 is returned to the pump column 505 after the maintenance, it is necessary to prevent air, entrained by the pump 500, from entering the pump column 505. If air enters the pump column 505 together with the pump 500, moisture in the air will be cooled and solidified by the ultra-low temperature liquefied gas, and as a result, the rotation of the pump 500 will be hindered. In particular, when the liquefied gas is liquid hydrogen, nitrogen and oxygen in the air are liquefied or solidified and may be mixed into the liquefied gas. The solidification of nitrogen and oxygen can damage equipment. Moreover, mixture the liquefied oxygen with the liquid hydrogen can cause an explosion.

When the pump 500 is removed from the pump column 505 for the purpose of maintenance or the like, it is also necessary to prevent the liquefied gas adhering to the pump 500 and vapor of the liquefied gas in the pump column 505 from being emitted into the atmosphere. For example, natural gas has flammability and has a property that accelerates greenhouse effect, and thus it is necessary to prevent the emission of natural gas into the atmosphere. Further, hydrogen has a risk of causing explosion as a result of chemical reaction with oxygen in the atmosphere, and therefore hydrogen should also not to be emitted into the atmosphere.

Therefore, the present invention provides a purge apparatus and a purge method capable of preventing air from being entrained by a submersible pump when the submersible pump is carried into a pump column, and capable of warming the submersible pump to prevent component in the air from being liquefied when the submersible pump is removed from the pump column, thereby preventing liquefied gas from being emitted into the atmosphere.

Solution to Problem

In an embodiment, there is provided A purge apparatus for exposing a submersible pump to purge gas, the submersible pump being used to deliver liquefied gas, the purge apparatus comprising: a hermetic purge container configured to accommodate the submersible pump therein; a vacuum line coupled to the hermetic purge container and coupled to a vacuum source; a purge-gas supply line coupled to the hermetic purge container and coupled to a purge-gas supply source; and a purge-gas supply valve mounted to the purge-gas supply line.

In an embodiment, the container body includes: a container body having an interior space for accommodating the submersible pump therein; an upper hermetic lid configured to close an upper opening of the container body; an upper seal configured to seal a gap between the container body and the upper hermetic lid; a lower hermetic lid configured to close a lower opening of the container body; and a lower seal configured to seal a gap between the container body and the lower hermetic lid.

In an embodiment, the purge-gas supply source comprises of a plurality of purge-gas supply sources.

In an embodiment, the plurality of purge-gas supply sources includes at least nitrogen-gas supply source and helium-gas supply source.

In an embodiment, the purge apparatus further comprises a check valve mounted to the vacuum line.

In an embodiment, there is provided a purge apparatus for exposing a submersible pump to purge gas, the submersible pump being used to deliver liquefied gas, the purge apparatus comprising: a purge container configured to accommodate the submersible pump therein; a pump cover configured to close an opening of the submersible pump; a pump evacuation line coupled to the pump cover; a vacuum line coupled to a vacuum source; a purge-gas supply line coupled to a purge-gas supply source; and a switching device configured to selectively couple the pump evacuation line to one of the vacuum line and the purge-gas supply line.

In an embodiment, the purge-gas supply line is coupled to the purge container.

In an embodiment, the vacuum line is coupled to the purge container.

In an embodiment, there is provided a purge method for exposing a submersible pump to a purge gas, the submersible pump being used to deliver liquefied gas, the purge method comprising: accommodating the submersible pump in an interior space of a hermetic purge container; vacuuming the interior space in which the submersible pump is accommodated; supplying purge gas into the vacuumed interior space; and moving the submersible pump from the hermetic purge container into a pump column.

In an embodiment, vacuuming of the interior space and supplying of the purge gas into the vacuumed interior space are repeated.

In an embodiment, the purge gas finally supplied into the interior space is helium gas.

In an embodiment, the purge gas initially supplied into the interior space is nitrogen gas.

In an embodiment, the supplying of purge gas into the vacuumed interior space is started before the vacuuming of the interior space is completed.

In an embodiment, the purge method further comprises vacuuming again the interior space, in which the submersible pump is accommodated, to lower a pressure in the interior space to a pressure equal to or less than a target pressure, after supplying the purge gas into the interior space and before moving the submersible pump from the hermetic purge container into the pump column.

In an embodiment, the liquefied gas is liquid hydrogen; the purge gas is nitrogen gas; and the target pressure is expressed by $$Pv = Pa \cdot Vm/(Vc \cdot \rho G/\rho S)$$

where Pv represents the target pressure, Pa represents atmospheric pressure, Vm represents a preset constant, Vc represents a volume of the interior space, ρG represents a density of nitrogen gas, and ρS represents a density of solid nitrogen.

In an embodiment, the preset constant Vm is a maximum volume of ice that the submersible pump can be operated in the interior space under a condition where the ice has been precipitated in the interior space.

In an embodiment, there is provided a purge method for exposing a submersible pump to a purge gas, the submersible pump being used to deliver liquefied gas, the purge method comprising: pulling up the submersible pump out of the pump column; accommodating the submersible pump in an interior space of a hermetic purge container; vacuuming the interior space in which the submersible pump is accommodated; and supplying the purge gas into the vacuumed interior space.

In an embodiment, vacuuming of the interior space and supplying of the purge gas into the vacuumed interior space are repeated.

In an embodiment, the purge gas initially supplied into the interior space is helium gas.

In an embodiment, the purge gas finally supplied into the interior space is nitrogen gas.

In an embodiment, the supplying of purge gas into the vacuumed interior space is started before the vacuuming of the interior space is completed.

In an embodiment, gas in the interior space is delivered to a gas treatment device through a vacuum line while vacuuming the interior space.

In an embodiment, there is provided a purge method for exposing a submersible pump to a purge gas, the submersible pump being used to deliver liquefied gas, the purge method comprising: closing an opening of the submersible pump with a pump cover; vacuuming an interior space of the submersible pump; and supplying the purge gas into the vacuumed interior space of the submersible pump.

In an embodiment, the purge method further comprises accommodating the submersible pump in a purge container and supplying purge gas into an interior space of the purge container before vacuuming the interior space of the submersible pump.

In an embodiment, the purge method further comprises accommodating the submersible pump in a purge container and supplying purge gas into an interior space of the purge container after supplying the purge gas into the interior space.

Advantageous Effects of Invention

According to the present invention, the interior space of the hermetic purge container, in which the submersible pump is accommodated, is vacuumed. As a result, a pressure in the hermetic purge container is decreased, so that air entrained by the submersible pump can be removed. Additionally, moisture adhering to the submersible pump is more likely to be dried. After the hermetic purge container is vacuumed, the purge gas is supplied into the interior space of the hermetic purge container. With this operation, the submersible pump is exposed to the purge gas in the hermetic purge container. Air and moisture entrained by the submersible pump are removed from the submersible pump by the purge gas, and as a result, the submersible pump is dried or deaerated (this operation will be hereinafter referred to as dry-up operation). Therefore, the air and moisture are not entrained by the submersible pump, and thus the air and moisture can be prevented from entering the pump column.

Further, according to the present invention, after the submersible pump, which has been in contact with liquefied gas, is pulled up out of the pump column into the hermetic purge container, the interior space of the hermetic purge container is vacuumed to thereby vaporize the liquefied gas on the submersible pump, so that the liquefied gas can be removed from the submersible pump. After vacuuming, the purge gas is supplied into the interior space of the hermetic purge container to warm the ultra-low temperature submersible pump (this operation will be hereinafter referred to as hot-up operation). Components in the air, such as nitrogen, are not liquefied on surfaces of the warmed submersible pump.

In particular, the present invention is effective when the liquefied gas is liquid hydrogen. Specifically, the submersible pump that has been immersed in liquid hydrogen has an ultra-low temperature equivalent to that of liquid hydrogen when the submersible pump is pulled up out of the pump column. The boiling point of hydrogen (−253° C.) is lower than the boiling point of oxygen (−183° C.) and the boiling point of nitrogen (−196° C.). Therefore, when the air comes into contact with the submersible pump immediately after the submersible pump is pulled up out of the pump column, not only nitrogen in the air but also oxygen is liquefied and may drop into the pump column. In this regard, according to the present invention, the submersible pump that has been immersed in liquid hydrogen is warmed by the purge gas before the submersible pump contacts the air. Therefore, when the air comes into contact with the submersible pump, the oxygen and nitrogen in the air are not liquefied, and thus the liquefied oxygen and liquefied nitrogen do not drop into the pump column. As a result, safe removal of the submersible pump can be achieved.

Furthermore, according to the present invention, the interior space of the submersible pump is vacuumed, and then the purge gas is supplied into the submersible pump, so that the inside of the submersible pump can be reliably dried.

DESCRIPTION OF EMBODIMENTS

Hereinafter, embodiments of the present invention will be described with reference to the drawings.

Figure 1:
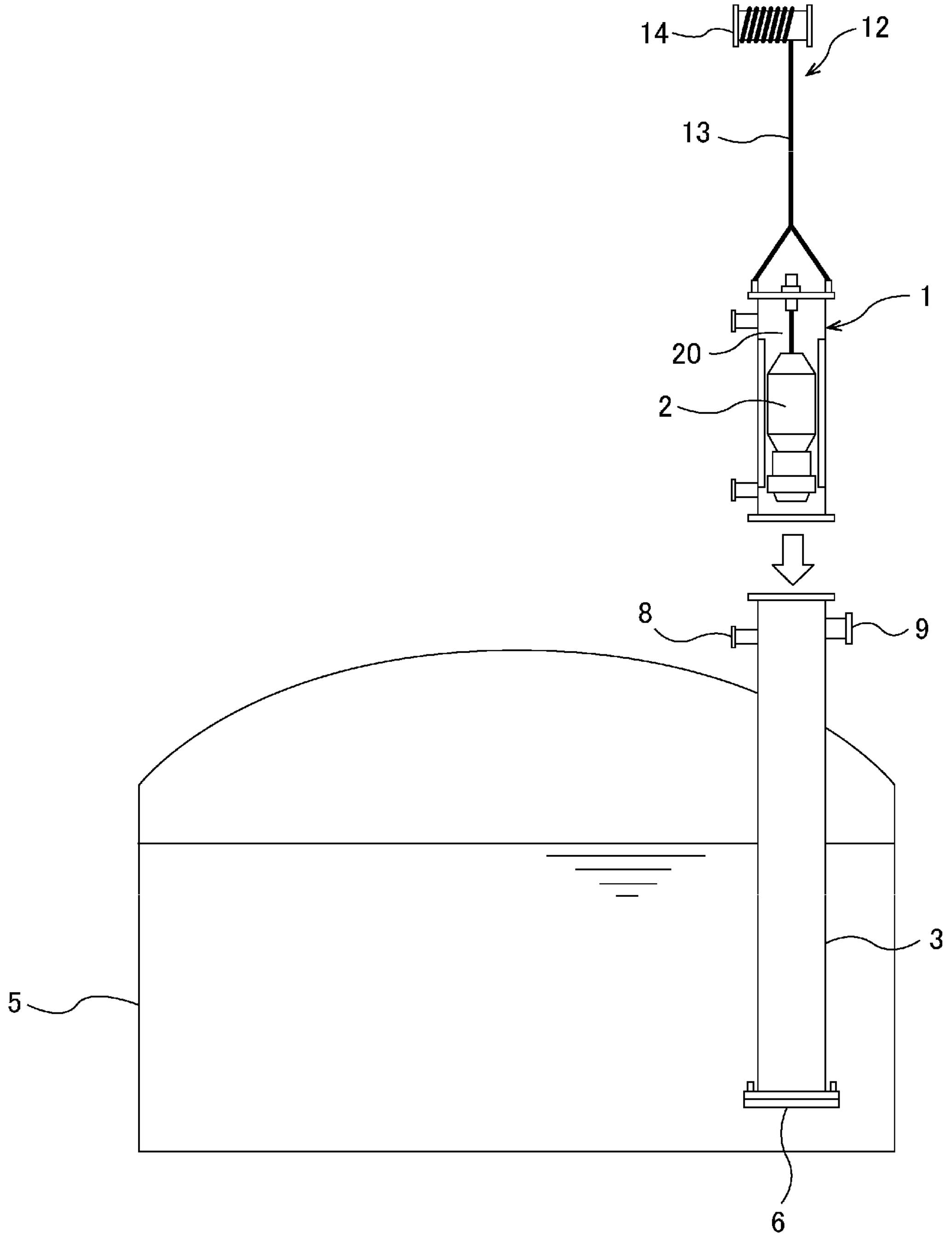
FIG. 1 is a schematic view for illustrating an operation of exposing a submersible pump to purge gas in a hermetic purge container before the submersible pump is installed in a pump column.

FIG. 1 is a schematic view for illustrating an operation of exposing a submersible pump to purge gas in a hermetic purge container before the submersible pump is installed in a pump column. A hermetic purge container 1 is a device for exposing a submersible pump 2 to purge gas. The submersible pump 2 is used for delivering liquefied gas. Examples of the liquefied gas include liquefied ammonia, liquid hydrogen, liquid nitrogen, liquefied natural gas, liquefied ethylene gas, and liquefied petroleum gas. The hermetic purge container 1 is detachably coupled to a pump column 3. The hermetic purge container 1 is configured to be able to be transported together with the submersible pump 2 accommodated therein. In one embodiment, the hermetic purge container 1 may be secured to an upper portion of the pump column 3.

As shown in FIG. 1, the pump column 3 is installed in a liquefied-gas storage tank 5 in which the liquefied gas is stored. The pump column 3 is a vertically extending hollow container, and its upper portion protrudes upward from the liquefied-gas storage tank 5. A suction valve 6 is provided at a bottom of the pump column 3. The submersible pump 2 is installed on the bottom of the pump column 3. The structure of the suction valve 6 is not particularly limited. For example, the suction valve 6 may be of a type in which the suction valve 6 is opened by the weight of the submersible pump 2, or may be an actuator-driven valve (for example, an electric valve).

The hermetic purge container 1 is transported to a position above the pump column 3 together with the submersible pump 2 by a transporting device (not shown), such as a crane. Further, as shown in FIG. 1, the hermetic purge container 1 is coupled to a cable 13 of an elevating device 12. The hermetic purge container 1 is elevated and lowered together with the submersible pump 2 by the elevating device 12. The elevating device 12 has a take-up device 14, such as a hoist or a winch, for hoisting the cable 13.

An interior space 20 of the hermetic purge container 1 is filled with purge gas, and the submersible pump 2 is exposed to the purge gas (i.e., the submersible pump 2 contacts the purge gas). The hermetic purge container 1 is configured to be coupled to the upper portion of the pump column 3. The interior space 20 of the hermetic purge container 1 is filled with the purge gas before the hermetic purge container 1 is coupled to the upper portion of the pump column 3. Specifically, the purge gas is supplied into the hermetic purge container 1 when the submersible pump 2 is located in the hermetic purge container 1. With the interior space 20 of the hermetic purge container 1 filled with the purge gas, the hermetic purge container 1 is elevated or lowered together with the submersible pump 2 by the elevating device 12.

The purge gas may be supplied into the hermetic purge container 1 at a location remote from the liquefied-gas storage tank 5. Alternatively, the purge gas may be supplied into the hermetic purge container 1 after the hermetic purge container 1 is coupled to the cable 13 of the elevating device 12 and before the hermetic purge container 1 is coupled to the upper portion of the pump column 3. In one embodiment, the purge gas may be supplied into the hermetic purge container 1 after the hermetic purge container 1 is coupled to the upper portion of the pump column 3 and before the submersible pump 2 is moved into the pump column 3 by the elevating device 12. In either case, the submersible pump 2 is exposed to the purge gas within the hermetic purge container 1, so that air and moisture are expelled from an interior and surfaces of the submersible pump 2. In the following descriptions, a process of exposing the submersible pump 2 to the purge gas in the hermetic purge container 1 before the submersible pump 2 is put into the pump column 3 will be referred to as drying-up operation.

The liquefied gas is discharged from the pump column 3 before or after the drying-up operation. Specifically, with an upper opening of the pump column 3 closed, purge gas is supplied into the pump column 3 from a purge-gas introduction port 8, so that the liquefied gas is discharged from the pump column 3 through the suction valve 6 by a pressure of the purge gas. In one embodiment, discharging of the liquefied gas from the pump column 3 may be performed before the hermetic purge container 1 is transported together with the submersible pump 2 to the location above the pump column 3. In one embodiment, discharging of the liquefied gas from the pump column 3 may be performed after the hermetic purge container 1 has been transported together with the submersible pump 2 to the location above the pump column 3.

After the submersible pump 2 is placed on the upper portion of the pump column 3 and the drying-up operation for the submersible pump 2 is completed, the submersible pump 2 is lowered (moved) from the hermetic purge container 1 into the pump column 3 by the elevating device 12 until the submersible pump 2 is installed on the bottom of the pump column 3. Before or after the submersible pump 2 is installed on the bottom of the pump column 3, the upper opening of the pump column 3 is closed by a lid. When the suction valve 6 is opened, the liquefied gas in the liquefied-gas storage tank 5 flows into the pump column 3. The submersible pump 2 is operated to pump up the liquefied gas while the entire submersible pump 2 is immersed in the liquefied gas. The submersible pump 2 is a pump configured to be operable in liquid. The purge-gas introduction port 8 and a liquefied-gas discharge port 9 are provided on the upper portion of the pump column 3. The liquefied gas pumped up by the submersible pump 2 is discharged through the liquefied-gas discharge port 9.

Figure 2:
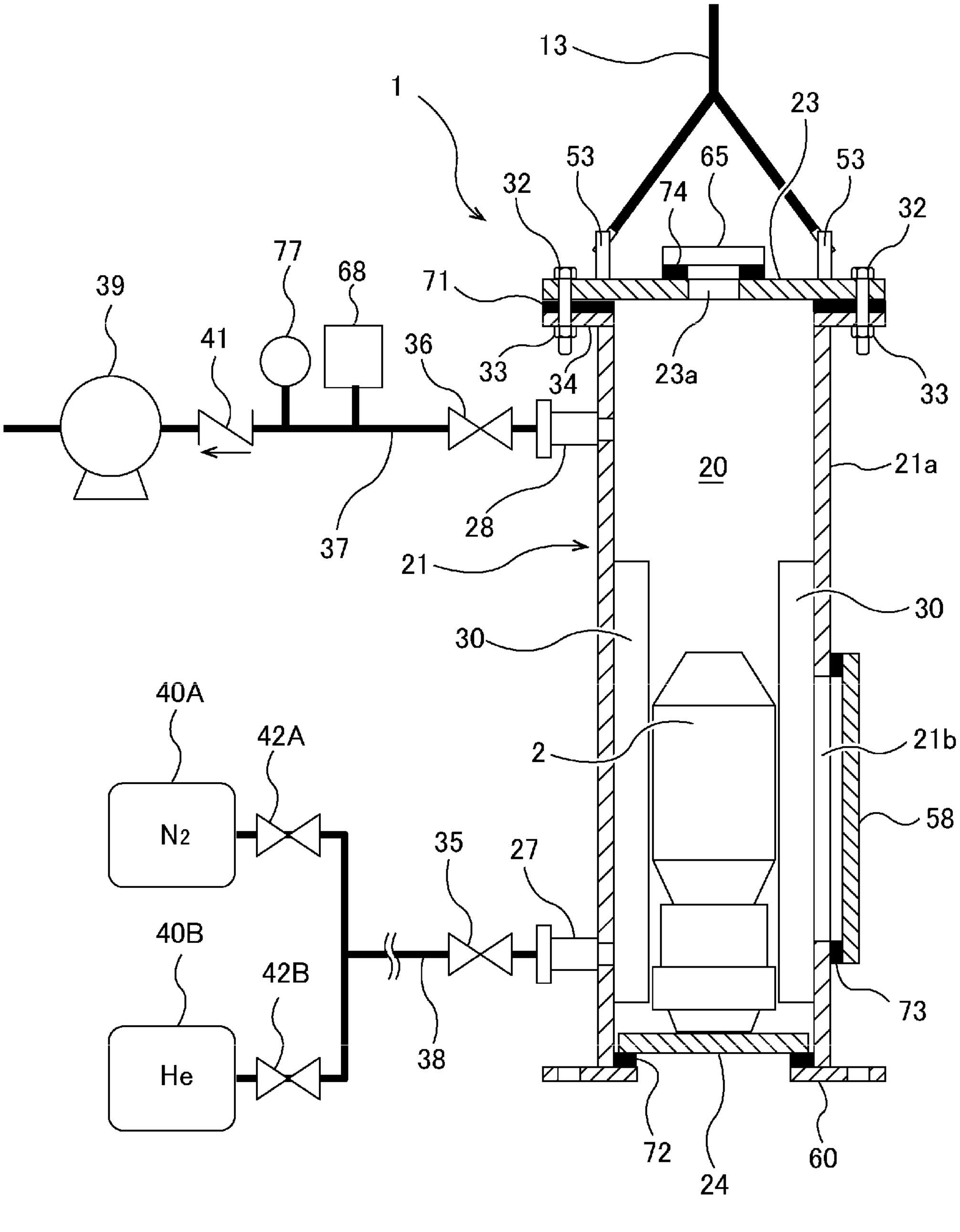
FIG. 2 is a view for illustrating an embodiment of a purge apparatus including the hermetic purge container.

FIG. 2 is a view showing an embodiment of a purge apparatus including the hermetic purge container 1. The purge apparatus includes the hermetic purge container 1 for accommodating the submersible pump 2 therein, a vacuum line 37 coupled to the hermetic purge container 1 and coupled to a vacuum source 39, a purge-gas supply line 38 coupled to the hermetic purge container 1 and coupled to purge-gas supply sources 40A and 40B, and a purge-gas supply valve 35 mounted to the purge-gas supply line 38.

The hermetic purge container 1 includes a container body 21 having an interior space 20 for accommodating the submersible pump 2 therein, an upper hermetic lid 23 configured to close an upper opening of the container body 21, an upper seal 71 configured to seal a gap between the container body 21 and the upper hermetic lid 23, a lower hermetic lid 24 configured to close a lower opening of the container body 21, and a lower seal 72 configured to seal a gap between the container body 21 and the lower hermetic lid 24. Each of the upper hermetic lid 23 and the lower hermetic lid 24 has a structure that does not allow a gas to pass therethrough. Examples of the upper seal 71 and the lower seal 72 include gasket, and O-ring.

The submersible pump 2 is placed on the lower hermetic lid 24. Therefore, a load of the submersible pump 2 is supported by the lower hermetic lid 24. The lower hermetic lid 24 is configured to be able to support the submersible pump 2. More specifically, the lower hermetic lid 24 has sufficiently high mechanical strength to support the load of the submersible pump 2. When a vacuum is formed in the container body 21, a differential pressure between the interior space 20 of the container body 21 and an outside of the container body 21 is applied to the lower hermetic lid 24. The lower hermetic lid 24 has a mechanical strength high enough to bear this differential pressure.

The upper hermetic lid 23 has a hole 23*a* formed in a center thereof, through which the cable 13 of the elevating device 12 is allowed to pass. The hole 23*a* is closed by a second lid 65. A second seal 74 is sandwiched between the upper hermetic lid 23 and the second lid 65. This second seal 74 is configured to seal a gap between the upper hermetic lid 23 and the second lid 65. Examples of the second seal 74 include gasket, and O-ring. The second lid 65 is secured to the upper hermetic lid 23 by screws not shown. After the screws are removed, the second lid 65 can be removed from the upper hermetic lid 23.

The hermetic purge container 1 includes a purge-gas inlet port 27 and a vacuum-evacuation port 28 which communicate with the interior space 20 of the container body 21. The purge-gas supply line 38 is coupled to the purge-gas inlet port 27, and the vacuum line 37 is coupled to the vacuum-evacuation port 28. The container body 21 has a hollow structure. In this embodiment, the container body 21 has a cylindrical shape, but the shape of the container body 21 is not particularly limited. In one embodiment, the container body 21 may have a polygonal hollow structure, or may have other shape.

The hermetic purge container 1 includes pump guides 30 configured to suppress lateral shaking of the submersible pump 2. The pump guides 30 are secured to an inner surface of the container body 21. The pump guides 30 are arranged around the submersible pump 2 disposed in the container body 21. The pump guides 30 are provided for the purpose of suppressing (or preventing) the horizontal shaking of the submersible pump 2 within the container body 21 when the hermetic purge container 1 with the submersible pump 2 disposed therein is transported by the transporting device, such as a crane. As long as such purpose can be achieved, multiple pump guides 30 may be provided, or a single pump guide 30 may be provided. The pump guides 30 may be made of metal, elastic material, or a combination thereof. In one embodiment, the pump guides 30 may be secured to a side surface of the submersible pump 2, instead of the inner surface of the container body 21. The container body 21 may be secured to the upper portion of the pump column 3 (see FIG. 1). In this case, the pump guide(s) 30 may be omitted because the hermetic purge container 1 is not transported together with the submersible pump 2.

The hermetic purge container 1 includes a plurality of bolts 32 and a plurality of nuts 33 which serve as securing device for detachably securing the upper hermetic lid 23 to the container body 21. The container body 21 has an upper flange 34 at the upper portion of the container body 21. The plurality of bolts 32 extend through the upper hermetic lid 23, the upper seal 71, and the upper flange 34. When the plurality of nuts 33 are fastened to the plurality of bolts 32 respectively, the upper hermetic lid 23 is firmly secured to the container body 21, and the upper seal 71 is sandwiched between the upper hermetic lid 23 and the container body 21. When the nuts 33 are removed from the bolts 32, the upper hermetic lid 23 can be removed from the container body 21. In one embodiment, the securing device for detachably securing the upper hermetic lid 23 to the container body 21 may be one or more clamps, instead of the bolts 32 and the nuts 33.

The purge-gas inlet port 27 and the vacuum-evacuation port 28 are secured to a side wall 21*a* of the container body 21. More specifically, the purge-gas inlet port 27 is secured to a lower portion of the side wall 21*a* of the container body 21, and the vacuum-evacuation port 28 is secured to an upper portion of the side wall 21*a* of the container body 21. In this embodiment, the vacuum-evacuation port 28 is located higher than the purge-gas inlet port 27, while their arrangements are not limited to this embodiment. In one embodiment, the purge-gas inlet port 27 may be secured to the upper portion of the side wall 21*a* of the container body 21, and the vacuum-evacuation port 28 may be secured to the lower portion of the side wall 21*a* of the container body 21. Alternatively, the purge-gas inlet port 27 and the vacuum-evacuation port 28 may be located at the same height. Furthermore, in one embodiment, one of the purge-gas inlet port 27 and the vacuum-evacuation port 28 may be secured to the upper hermetic lid 23.

The purge gas used is gas composed of component (or element) having a boiling point lower than or equal to the boiling point of the liquefied gas to be pumped up by the submersible pump 2. This is because of preventing the purge gas from being liquefied when the purge gas contacts the liquefied gas or the ultra-low temperature submersible pump 2. Examples of purge gas include inert gas, such as nitrogen gas and helium gas. For example, when the liquefied gas to be pumped up by the submersible pump 2 is liquefied natural gas, nitrogen gas is used for the purge gas, since the nitrogen gas is composed of nitrogen having a boiling point (−196° C.) lower than the boiling point (−162° C.) of the liquefied natural gas. In another example, when the liquefied gas to be pumped up by the submersible pump 2 is liquid hydrogen, helium gas is used for the purge gas, since the helium gas is composed of helium having a boiling point (−269° C.) lower than the boiling point of hydrogen (−253° C.).

In this embodiment, the first purge-gas supply source 40A and the second purge-gas supply source 40B are coupled to the purge-gas supply line 38. More specifically, the first purge-gas supply source 40A is a nitrogen-gas supply source, and the second purge-gas supply source 40B is a helium-gas supply source. The first purge-gas supply source 40A and the second purge-gas supply source 40B are coupled to a first shutoff valve 42A and a second shutoff valve 42B, respectively. The first shutoff valve 42A and the second shutoff valve 42B are mounted to the purge-gas supply line 38. When the second shutoff valve 42B is closed and the first shutoff valve 42A is opened, nitrogen gas as purge gas is supplied from the first purge-gas supply source 40A through the purge-gas supply line 38, the purge-gas supply valve 35, and the purge-gas inlet port 27 into the interior space 20 of the container body 21. When the first shutoff valve 42A is closed and the second shutoff valve 42B is opened, helium gas as purge gas is supplied from the second purge-gas supply source 40B through the purge-gas supply line 38, the purge-gas supply valve 35, and the purge-gas inlet port 27 into the interior space 20 of the container body 21.

Helium gas is generally more expensive than nitrogen gas. Nitrogen has a larger atomic weight than that of helium, and therefore has a higher drying effect. Therefore, nitrogen gas may be used as the purge gas at first, and helium gas may be used as the purge gas in a final stage. For example, nitrogen gas may be supplied into the hermetic purge container 1 to replace air in the interior space 20 of the container body 21 with nitrogen gas, and then helium gas may be supplied into the hermetic purge container 1 to fill the interior space 20 of the container body 21.

In one embodiment, only one of the first purge-gas supply source 40A and the second purge-gas supply source 40B may be provided. For example, when the liquefied gas to be pumped up by the submersible pump 2 is liquefied natural gas, only the purge-gas supply source 40A, which is nitrogen-gas supply source, may be provided. In another example, when the liquid gas to be pumped up by the submersible pump 2 is liquid hydrogen, only the purge-gas supply source 40B, which is helium-gas supply source, may be provided. In still another example, three or more different purge-gas supply sources may be provided.

The upper hermetic lid 23 has a plurality of coupling ports 53 to which the cable 13 of the elevating device 12 is coupled. Each coupling port 53 is a structure having a hole through which the cable 13 can be inserted. A specific shape of each coupling port 53 is not particularly limited. The cable 13 is branched into a plurality of parts to have a plurality of distal ends. These distal ends are coupled to the coupling ports 53, respectively.

The container body 21 has a lower flange 60 at a lower portion thereof. The lower hermetic lid 24 is disposed above the lower flange 60, and the lower seal 72 is sandwiched between the lower hermetic lid 24 and the lower flange 60. The lower hermetic lid 24 is removably arranged at the bottom of the container body 21. An entire load of the submersible pump 2 is applied to the lower hermetic lid 24, and the submersible pump 2 presses a lower surface of the lower hermetic lid 24 against the lower seal 72 on the lower flange 60. The lower hermetic lid 24 may be removably secured to the container body 21 by screws or by one or more clamps.

The hermetic purge container 1 further includes a side lid 58 configured to close an opening 21*b* formed in the side wall 21*a* of the container body 21, and a side seal 73 configured to seal a gap between the side wall 21*a* of the container body 21 and the side lid 58. The side seal 73 is sandwiched between the side wall 21*a* of the container body 21 and the side lid 58. Examples of the side seal 73 include gasket, and O-ring. The side lid 58 is removably secured to the side wall 21*a* of the container body 21 by a fastening mechanism (for example, a plurality of screws) not shown. When the side lid 58 is removed, a worker can access the lower hermetic lid 24 in the container body 21 through the opening 21*b* and can remove the lower hermetic lid 24 from the container body 21. Similarly, a worker can bring the lower hermetic lid 24 into the container body 21 through the opening 21*b* and can place the lower hermetic lid 24 on the lower seal 72.

The hermetic purge container 1 includes a purge index measuring device 68 communicating with the vacuum-evacuation port 28. The purge index measuring device 68 is configured to measure an index value indicating a degree of dryness of the submersible pump 2 that has been exposed to the purge gas, and/or to measure an index value indicating a temperature of the submersible pump 2 that has been exposed to the purge gas. Examples of the purge index measuring device 68 include dew-point meter, thermometer, and a combination thereof. For example, the dew-point meter measures an amount of moisture in the purge gas that has flowed out of the interior space 20 of the container body 21. Whether or not the submersible pump 2 exposed to the purge gas has been sufficiently dried (i.e., whether or not the drying-up operation described below is sufficiently performed) can be determined based on a measured value of the amount of moisture. The thermometer measures the temperature of the purge gas that has flowed out of the interior space 20. Whether or not the submersible pump 2 exposed to the purge gas has been sufficiently warmed (i.e., whether the hot-up operation described below is sufficiently performed) can be determined based on a measured value of the temperature of the purge gas that has contacted the submersible pump 2. The amount of moisture in the purge gas and the temperature of the purge gas are examples of index values for the drying-up operation and the hot-up operation for the submersible pump 2. The index values may be other physical quantities as long as they indicate the degree of dryness and the temperature of the submersible pump 2. In FIG. 2, the purge index measuring device 68 is coupled to the vacuum line 37, but the arrangement of the purge index measuring device 68 is not limited to the embodiment shown in FIG. 2, as long as the purge index measuring device 68 can fulfill its intended function.

The vacuum line 37 is coupled to the vacuum source 39, such as a vacuum pump. The vacuum line 37 may be a vacuum line as utility equipment provided in a facility where the liquefied gas storage tank 5 shown in FIG. 1 is installed, or may be a dedicated vacuum line which is provided to vacuum the interior space 20 of the hermetic purge container 1.

A vacuum valve 36 and a check valve 41 are mounted to the vacuum line 37. The vacuum valve 36 is opened when the interior space 20 of the hermetic purge container 1 is vacuumed using the vacuum line 37. In a case where a timing of vacuum evacuation is controlled by operating and stopping the vacuum pump used as the vacuum source 39, the vacuum valve 36 may not be provided. The check valve 41 is configured to allow gas to flow from the interior space 20 of the hermetic purge container 1 toward the outside of the hermetic purge container 1, while not allowing gas to flow in a reverse direction. The check valve 41 is provided to prevent ambient air from flowing back into the interior space 20 in which the vacuum has been formed. Arrangements and positions of the vacuum valve 36 and the check valve 41 are not limited to the embodiment shown in FIG. 2. For example, the check valve 41 may be located upstream of the vacuum valve 36.

The hermetic purge container 1 further has a pressure measuring device 77 configured to measure a pressure in the interior space 20. The pressure measuring device 77 is coupled to the vacuum line 37. In one embodiment, the pressure measuring device 77 may be coupled to the container body 21. The pressure measuring device 77 can measure the pressure in the interior space 20 in which the vacuum has been formed.

Figure 3:
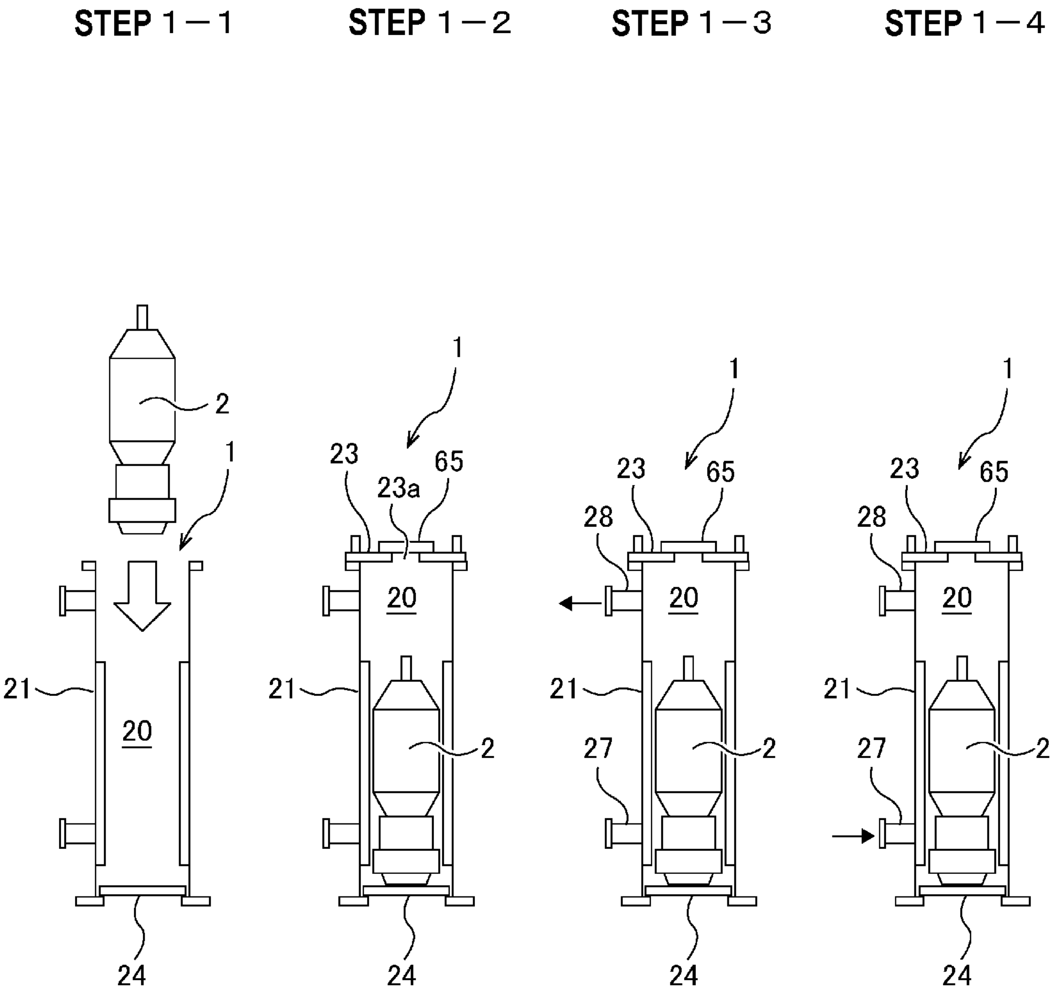
FIG. 3 illustrates an embodiment of a method of exposing the submersible pump to purge gas using the hermetic purge container.
Figure 4:
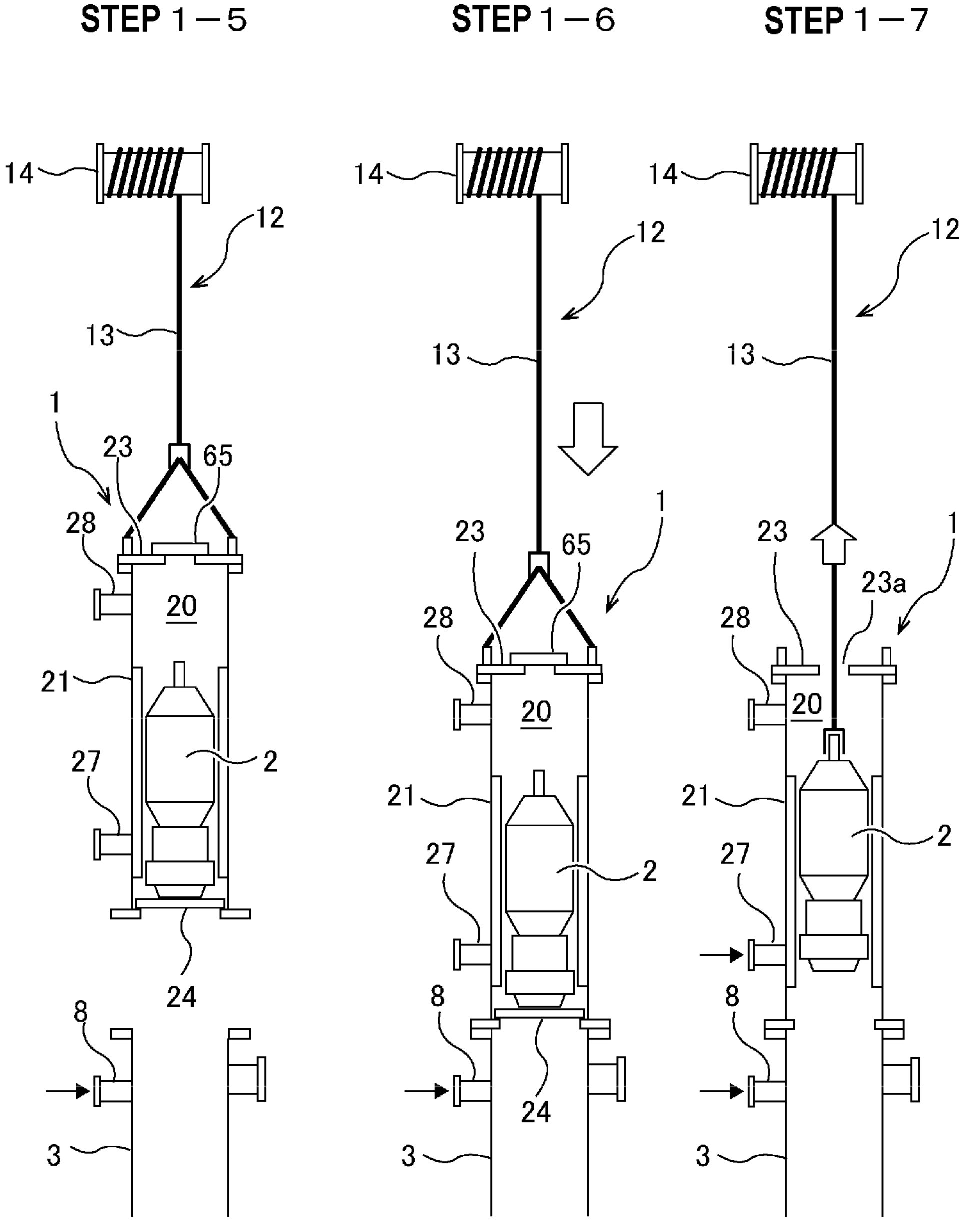
FIG. 4 illustrates an embodiment of a method of exposing the submersible pump to purge gas using the hermetic purge container.
Figure 5:
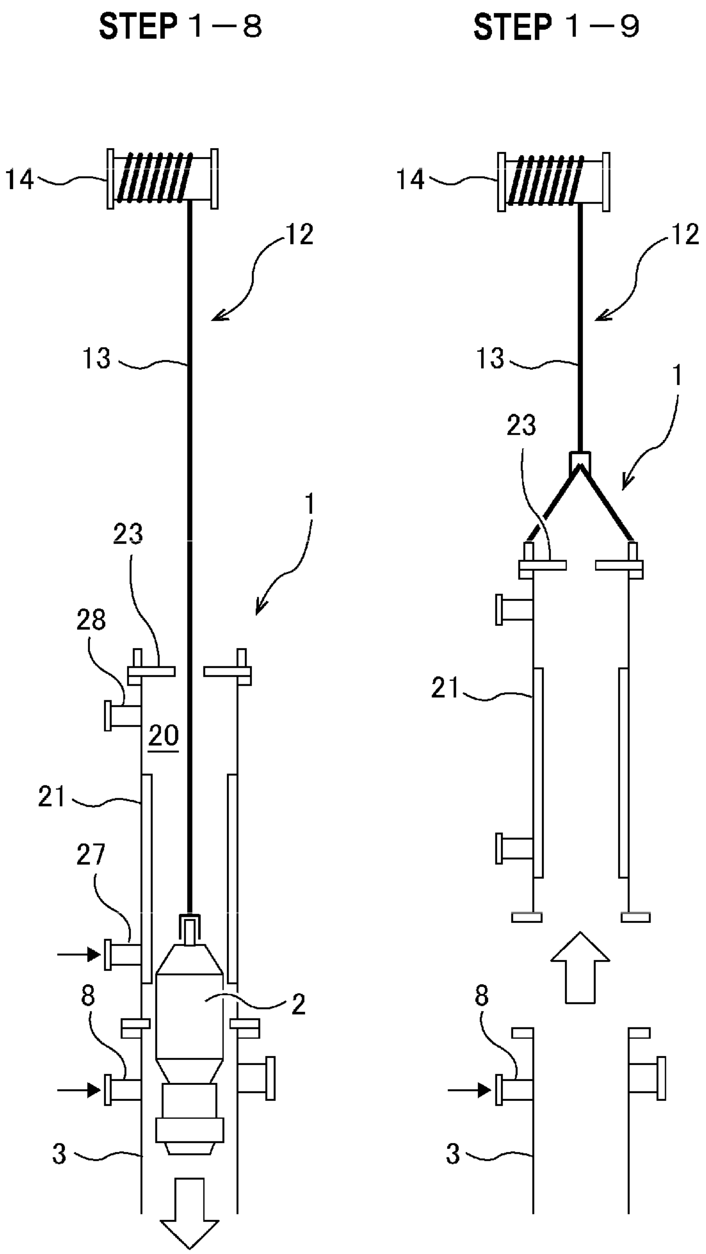
FIG. 5 illustrates an embodiment of a method of exposing the submersible pump to purge gas using the hermetic purge container.

Next, an embodiment of a method of exposing the submersible pump 2 to the purge gas using the hermetic purge container 1 described above will be described with reference to FIGS. 3 to 5. A series of operations shown in FIGS. 3 to 5 includes an operation of vacuuming the interior space 20 of the hermetic purge container 1 in which the submersible pump 2 has been accommodated, the drying-up operation of drying the submersible pump 2 with the purge gas, and an operation of carrying the dried submersible pump 2 into the pump column 3. The liquefied gas is expelled from the pump column 3 prior to operations described below In step 1-1, the lower hermetic lid 24 is placed to the bottom of the container body 21 of the hermetic purge container 1. With the upper hermetic lid 23 removed, the submersible pump 2 is accommodated into the interior space 20 of the container body 21. The submersible pump 2 is moved into the hermetic purge container 1 by a transporting device (e.g., crane) not shown. The submersible pump 2 is placed on the lower hermetic lid 24, and the load of the submersible pump 2 is supported by the lower hermetic lid 24.

In step 1-2, the upper hermetic lid 23 is mounted to the upper portion of the container body 21. The hole 23*a* of the upper hermetic lid 23 is closed by the second lid 65. The upper hermetic lid 23 is firmly secured to the container body 21 by the bolts 32 and the nuts 33 (see FIG. 2) serving as the securing device.

In step 1-3, with the upper opening of the container body 21 closed with the upper hermetic lid 23 and the lower opening of the container body 21 closed with the lower hermetic lid 24, the interior space 20 of the container body 21, in which the submersible pump 2 is accommodated, is vacuumed (or evacuated) through the vacuum-evacuation port 28. The vacuum valve 36 is opened and the purge-gas supply valve 35 is closed. This operation creates a vacuum in the interior space 20, thereby facilitating the drying of moisture adhering to the submersible pump 2.

In step 1-4, purge gas, such as nitrogen gas or helium gas, is supplied into the interior space 20, which has been vacuumed, through the purge-gas inlet port 27 to fill the interior space 20. The purge gas expels air and moisture from the submersible pump 2, so that the submersible pump 2 is dried (dry-up operation). An end of the dry-up operation is determined based on the index value (e.g., a measured value of the amount of moisture) output from the purge index measuring device 68. The process of supplying the purge gas into the interior space 20 may be started after the process of vacuuming the interior space 20 is completed, or may be started at the same time that the process of vacuuming the interior space 20 is completed. In one embodiment, the process of supplying the purge gas into the interior space 20 may be started before the process of vacuuming the interior space 20 is completed. Specifically, the end stage of the process of vacuuming the interior space 20 may overlap with the initial stage of the process of supplying the purge gas into the interior space 20 that has been vacuumed.

In order to reliably remove air and moisture from the submersible pump 2, the process of vacuuming the interior space 20 in the step 1-3 and the process of supplying the purge gas into the vacuumed interior space 20 in the step 1-4 may be repeated. Repeating the process of vacuuming the interior space 20 and the process of supplying the purge gas into the interior space 20 can quickly and reliably remove the air and moisture existing not only on the surfaces of the submersible pump 2 but also inside the submersible pump 2.

When the liquefied gas to be pumped up by the submersible pump 2 is liquid hydrogen, helium gas is used for the purge gas, since the helium gas is composed of helium having a boiling point (−269° C.) lower than the boiling point of hydrogen (−253° C.). This is because of preventing helium gas from being liquefied when the helium gas contacts the liquid hydrogen. However, helium gas is generally more expensive than nitrogen gas. In addition, nitrogen has a larger atomic weight than that of helium, and therefore has a higher drying effect. Therefore, nitrogen gas may be used as the purge gas at first, and helium gas may be used as the purge gas in a final stage. Specifically, in the case where the process of vacuuming the interior space 20 in the step 1-3 and the process of supplying the purge gas into the vacuumed interior space 20 in the step 1-4 are repeated, the purge gas supplied into the interior space 20 at the latest is helium gas. In this case, the purge gas supplied first into the interior space 20 is nitrogen gas. In this manner, the use of different types of purge gas can reduce costs of the operations.

The number of times the vacuuming of the interior space 20 and the supply of purge gas into the interior space 20 are repeated may be determined in advance, or may be determined based on the index value indicating the degree of dryness of the submersible pump 2 measured by the purge index measuring device 68. For example, the vacuuming of the interior space 20 and the supply of purge gas into the interior space 20 may be repeated until the index value indicating the degree of drying of the submersible pump 2 measured by the purge index measuring device 68 falls below (or exceeds) a threshold value.

In step 1-5, the hermetic purge container 1 filled with the purge gas is transported together with the submersible pump 2 to a location above the pump column 3 by a transporting device (e.g., crane) not shown. The cable 13 of the elevating device 12 is coupled to the upper hermetic lid 23. The hermetic purge container 1 in this embodiment is a transportable purge container which can be transported together with the submersible pump 2 accommodated therein. The hermetic purge container 1 with the submersible pump 2 accommodated therein is suspended by the elevating device 12. In order to prevent ambient air from entering the pump column 3, purge gas (e.g., inert gas, such as nitrogen gas or helium gas) is supplied into the pump column 3 through the purge-gas introduction port 8. The supply of purge gas into the pump column 3 is continued in the following steps.

In steps 1-6, the hermetic purge container 1 and the submersible pump 2 are lowered by the elevating device 12, and the hermetic purge container 1 is coupled to the upper portion of the pump column 3 by bolts and nuts (not shown) serving as a purge-container coupling mechanism. The purge-container coupling mechanism may be one or more clamps. The load of the submersible pump 2 is supported by the pump column 3 via the lower hermetic lid 24.

In step 1-7, the second lid 65 is removed from the upper hermetic lid 23 while the purge gas, such as nitrogen gas or helium gas, is supplied through the purge-gas inlet port 27 into the interior space 20 of the container body 21. The cable 13 of the elevating device 12 extends through the hole 23*a* of the upper hermetic lid 23 to the submersible pump 2, and is coupled to the submersible pump 2. Further, the submersible pump 2 is elevated in the container body 21 by the elevating device 12, and then the lower hermetic lid 24 is removed from the container body 21. The load of the submersible pump 2 is supported by the elevating device 12. The purge gas flows out through the hole 23*a* of the upper hermetic lid 23. Such flow of the purge gas can prevent the ambient air from flowing into the container body 21. As a cable for hoisting the submersible pump 2, a short auxiliary cable may be prepared in advance. A lower end of the auxiliary cable may be coupled to the upper portion of the submersible pump 2, and an upper end of the auxiliary cable may be hooked to a backside of the second lid 65. When the submersible pump 2 is to be elevated, the upper end of the auxiliary cable may be coupled to the cable 13 of the elevating device 12.

In step 1-8, the submersible pump 2 is lowered by the elevating device 12, and the submersible pump 2 is moved from the hermetic purge container 1 into the pump column 3. The supply of purge gas into the container body 21 is continued.

In step 1-9, the cable 13 of the elevating device 12 is coupled to the upper hermetic lid 23, and the bolts and nuts (not shown) as the purge-container coupling mechanism described above are removed. The hermetic purge container 1 is then pulled up by the elevating device 12 to be separated from the pump column 3.

According to this embodiment, air and moisture entrained by the submersible pump 2 are removed by the vacuuming of the interior space 20 and the supplying of the purge gas into the interior space 20, and as a result, the submersible pump 2 is dried. Therefore, air and moisture can be prevented from entering the pump column 3.

In this embodiment, the steps 1-3 and 1-4 described above are performed at a location remote from the pump column 3. In one embodiment, after the submersible pump 2 is placed in the hermetic purge container 1, the hermetic purge container 1 is transported to the pump column 3 together with the submersible pump 2, and then the vacuuming of the hermetic purge container 1 and the supply of purge gas into the hermetic purge container 1 may be started after the hermetic purge container 1 is coupled to the pump column 3. More specifically, the vacuuming of the hermetic purge container 1 and the dry-up operation for the submersible pump 2 may be started after the hermetic purge container 1 is coupled to the pump column 3. Alternatively, in one embodiment, after the submersible pump 2 is placed in the hermetic purge container 1 and the hermetic purge container 1 is transported together with the submersible pump 2 to a location above the pump column 3, the vacuuming of the hermetic purge container 1 and the supply of purge gas into the hermetic purge container 1 may be started before the hermetic purge container 1 is coupled to the pump column 3.

In one embodiment, after the purge gas is supplied in the interior space 20 and before the submersible pump 2 is moved from the hermetic purge container 1 into the pump column 3, the interior space 20, in which the submersible pump 2 is placed, may be vacuumed again until the pressure in the interior space 20 is lowered to a pressure equal to or less than a target pressure. Specifically, after the step 1-4 described above and before the step 1-5 described above, the interior space 20, in which the submersible pump 2 is placed, is vacuumed again such that the pressure in the interior space 20 is lowered to a pressure equal to or less than the target pressure. In this embodiment, the liquefied gas is liquid hydrogen, and the purge gas is nitrogen gas. Helium gas is not used as the purge gas. The pressure in the interior space 20 is measured by the pressure measuring device 77 shown in FIG. 2.

The target pressure described above is expressed by a following formula.

$$Pv = Pa \cdot Vm/(Vc \cdot \rho G/\rho S) \tag{1}$$

Here, Pv represents the target pressure, Pa represents atmospheric pressure, Vm represents a preset constant, Vc represents a volume of the interior space 20 of the hermetic purge container 1, ρG represents a density of nitrogen gas, and ρS represents a density of solid nitrogen. The preset constant Vm described above is maximum volume of ice that the submersible pump 2 can be operated in the interior space 20 under a condition where ice has been precipitated in the interior space 20. The constant Vm is determined based on experiments or operations in the past. In one example, air is introduced into the interior space 20 of the hermetic purge container 1 in which the submersible pump 2 is placed, and water in the air is frozen to precipitate ice in the interior space 20 to determine the maximum volume of ice in which the submersible pump 2 can perform normal operation. The fact that the submersible pump 2 can perform its operation in the interior space 20 where ice has been precipitated means that the submersible pump 2 can perform normal operation, i.e., the submersible pump 2 can discharge the liquefied gas at an intended flow rate.

As can be seen from the formula (1) mentioned above, the target pressure Pv is inversely proportional to the volume of the interior space 20 of the hermetic purge container 1. According to this embodiment, even if nitrogen gas existing in the interior space 20 comes into contact with liquid hydrogen and is solidified, the solidified nitrogen does not substantially interfere with the operation of the submersible pump 2. Therefore, it is unnecessary to use helium gas as the purge gas, thus enabling cost reduction.

Figure 6:
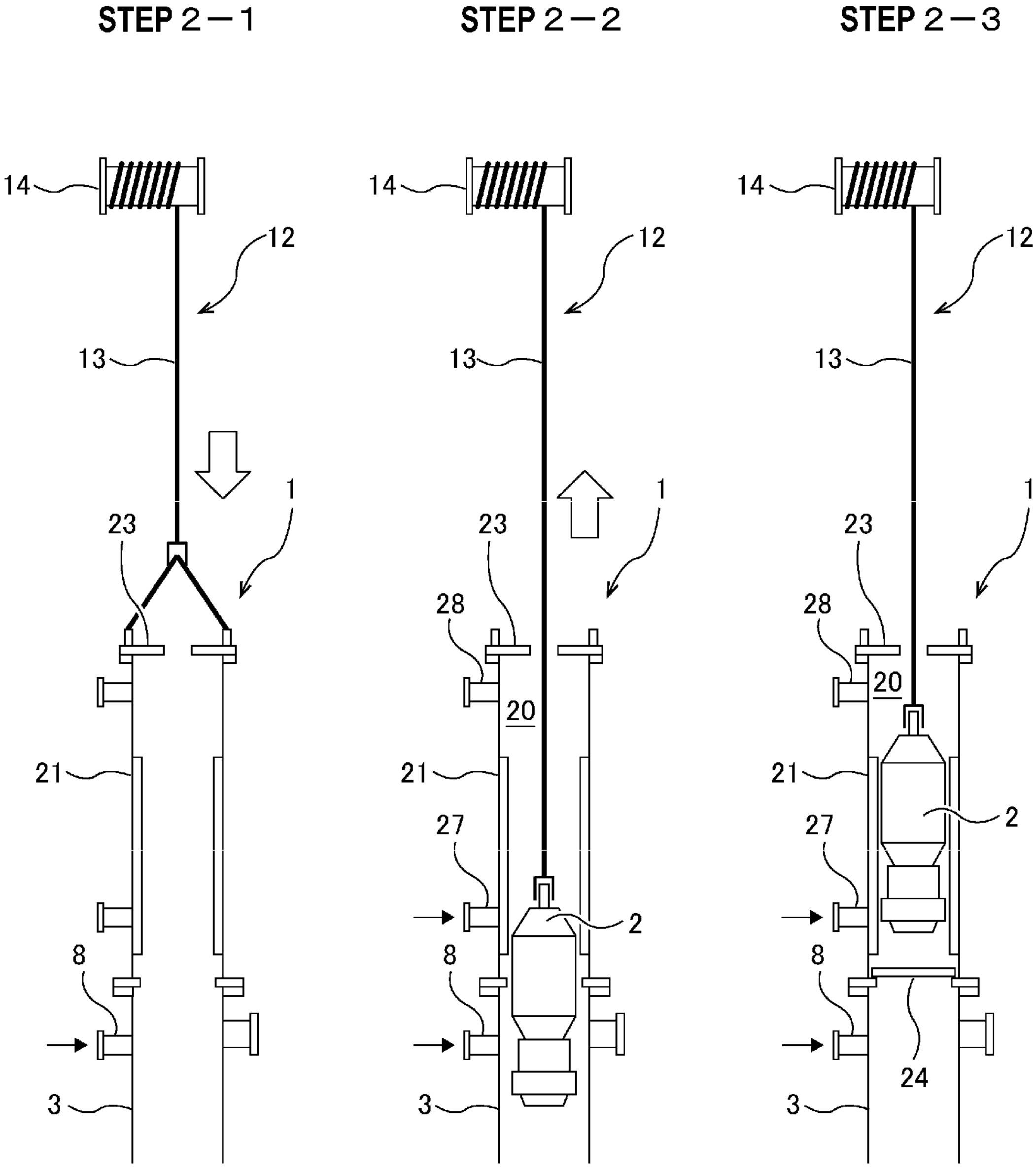
FIG. 6 illustrates an embodiment of operations of pulling up the submersible pump out of the pump column.
Figure 7:
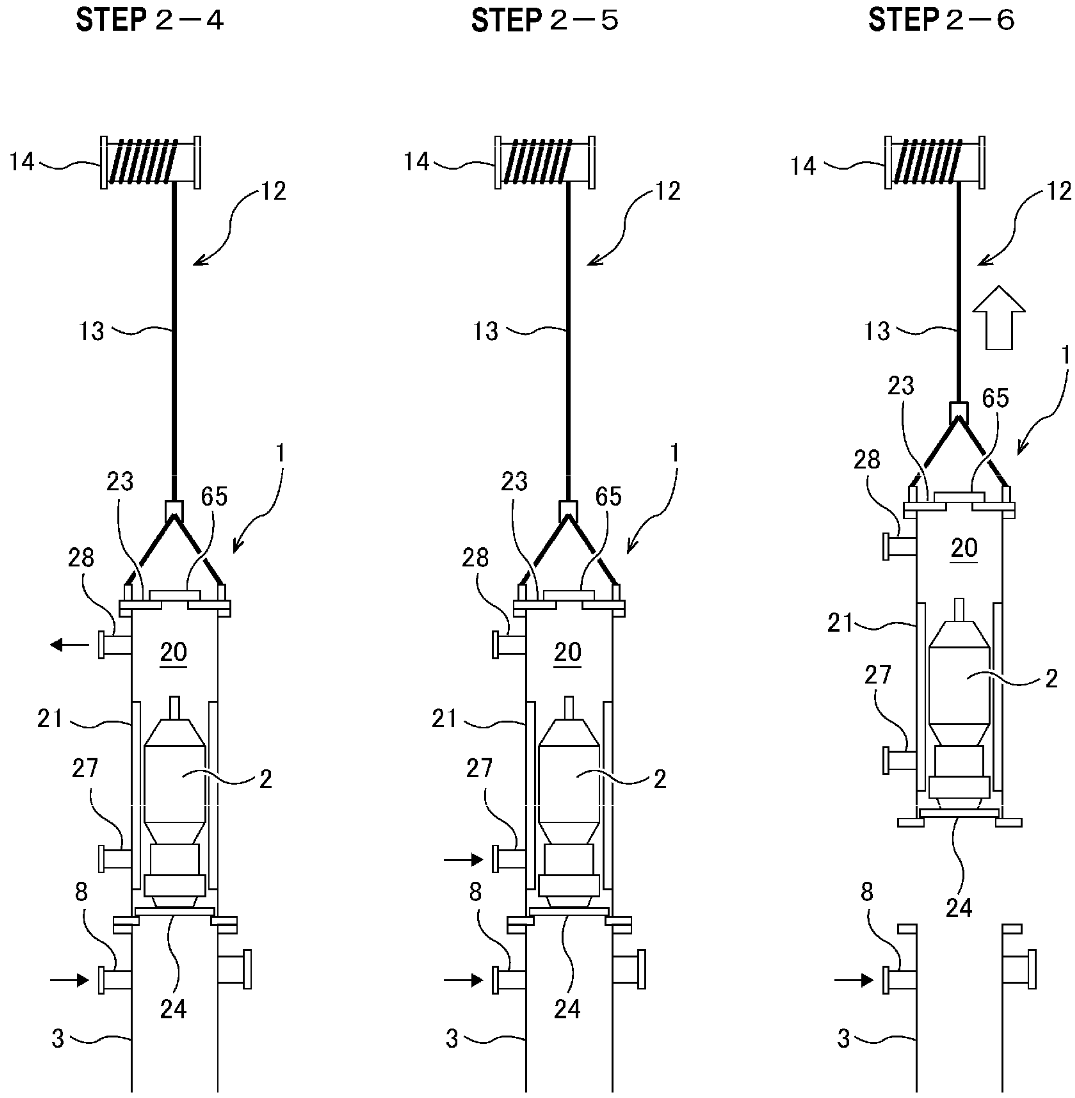
FIG. 7 illustrates an embodiment of operations of pulling up the submersible pump out of the pump column.
Figure 8:
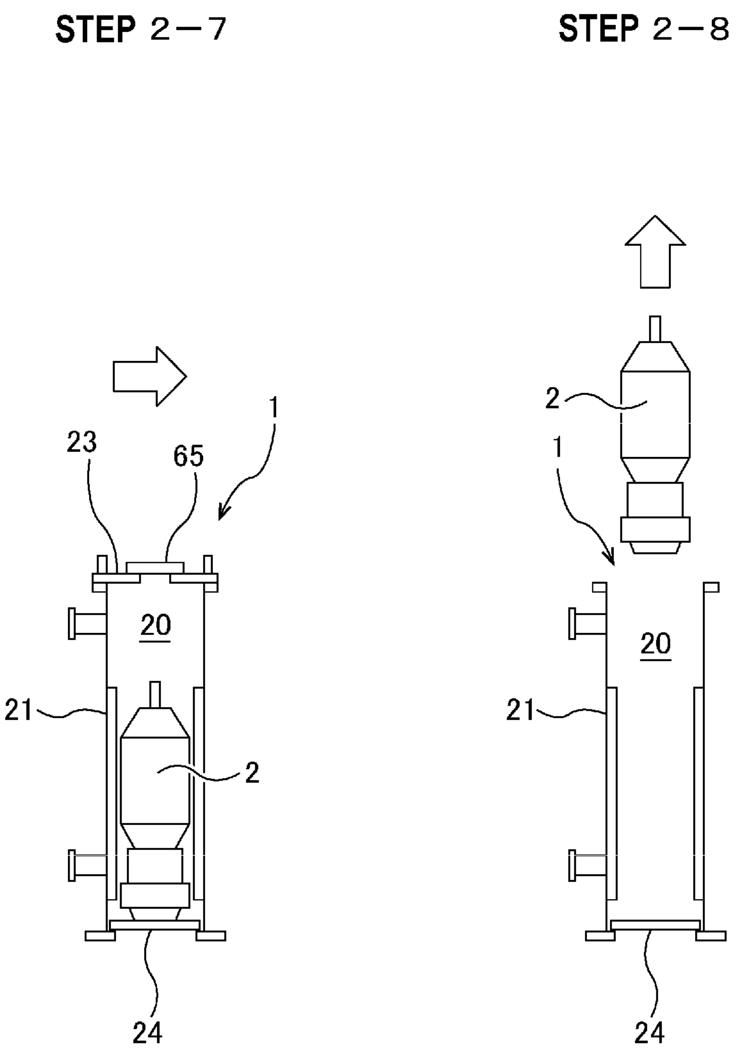
FIG. 8 illustrates an embodiment of operations of pulling up the submersible pump out of the pump column.

Next, an embodiment of processes of pulling up the submersible pump 2 out of the pump column 3 will be described with reference to FIGS. 6 to 8. A series of operations shown in FIGS. 6 to 8 includes an operation of pulling up the ultra-cold submersible pump 2, which has been in contact with the liquefied gas, out of the pump column 3, an operation of vacuuming the interior space 20 in which the submersible pump 2 is placed, and a hot-up operation of warming the submersible pump 2 with the purge gas. The liquefied gas is expelled from the pump column 3 prior to operations described below.

In step 2-1, the hermetic purge container 1 is lowered by the elevating device 12, and is coupled to the upper portion of the pump column 3 by bolts and nuts (not shown) serving as the purge-container coupling mechanism. At this stage, the lower hermetic lid 24 is not attached to the container body 21. The upper hermetic lid 23 is secured to the upper portion of the container body 21 by the bolts 32 and the nuts 33 (see FIG. 2) serving as the securing device, and the cable 13 of the elevating device 12 is coupled to the upper hermetic lid 23. In FIG. 6, the second lid 65 (see FIG. 2) has been removed from the upper hermetic lid 23, but may be attached to the upper hermetic lid 23. In order to prevent the ambient air from entering the pump column 3, purge gas (e.g., an inert gas, such as nitrogen gas or helium gas) is supplied into the pump column 3 through the purge-gas introduction port 8. The supply of the purge gas into the pump column 3 is continued in the following steps.

In step 2-2, the purge gas, such as nitrogen gas or helium gas, is supplied into the interior space 20 of the container body 21 through the purge-gas inlet port 27, and the submersible pump 2 is pulled out of the pump column 3 into the hermetic purge container 1 by the elevating device 12 while the interior space 20 is filled with the purge gas. The second lid 65 (see FIG. 2) has been removed from the upper hermetic lid 23.

In step 2-3, after the submersible pump 2 is located in the interior space 20 of the container body 21, the lower hermetic lid 24 is placed on the bottom of the container body 21.

In step 2-4, the submersible pump 2 is lowered in the container body 21 by the elevating device 12, until the submersible pump 2 is placed on the lower hermetic lid 24. The load of the submersible pump 2 is supported by the lower hermetic lid 24. The cable 13 of the elevating device 12 is separated from the submersible pump 2, and then is coupled to the upper hermetic lid 23. The supply of the purge gas into the interior space 20 is stopped, and the second lid 65 is mounted to the upper hermetic lid 23. Thereafter, with the upper opening of the container body 21 covered by the upper hermetic lid 23 and the lower opening of the container body 21 covered by the lower hermetic lid 24, the interior space 20 of the container body 21, in which the submersible pump 2 is placed, is vacuumed (or evacuated) through the vacuum-evacuation port 28. The vacuum valve 36 is opened, and the purge-gas supply valve 35 is closed. Vacuum is formed in the interior space 20 to thereby vaporize the liquefied gas attached to the submersible pump 2, so that the liquefied gas is removed from the submersible pump 2. The removed gas (e.g., natural gas, or hydrogen gas) is collected through the vacuum line 37 by a collecting device not shown, or is treated to be harmless by a treatment apparatus.

In step 2-5, the purge gas, such as nitrogen gas or helium gas, is supplied into the vacuumed interior space 20 through the purge-gas inlet port 27 to fill the interior space 20. The purge gas may have an ordinary temperature, or may be preheated by a heating device, such as a heater. The purge gas in the interior space 20 warms the submersible pump 2 (the hot-up operation). An end of the hot-up operation is determined based on the index value (for example, the measured value of temperature of the purge gas) output from the purge index measuring device 68.

The process of supplying the purge gas into the interior space 20 may be started after the process of vacuuming the interior space 20 is completed, or may be started at the same time the process of vacuuming the interior space 20 is completed. In one embodiment, the process of supplying the purge gas into the interior space 20 may be started before the process of vacuuming the interior space 20 is completed. Specifically, the end stage of the process of vacuuming the interior space 20 may overlap with the initial stage of the process of supplying the purge gas into the vacuumed interior space 20.

In order to reliably remove the liquefied gas from the submersible pump 2, the process of vacuuming the interior space 20 in the step 2-4 and the process of supplying the purge gas into the vacuumed interior space 20 in the step 2-5 may be repeated. Repeating the process of vacuuming the interior space 20 and the process of supplying the purge gas into the vacuumed interior space 20 can quickly and reliably remove the liquefied gas not only on the surfaces of the submersible pump 2 but also inside the submersible pump 2.

When the liquefied gas to be pumped up by the submersible pump 2 is liquid hydrogen, helium gas may be used as the purge gas at first, and nitrogen gas may be used as the purge gas in a final stage. Specifically, in the case where the process of vacuuming the interior space 20 in the step 2-4 and the process of supplying the purge gas into the vacuumed interior space 20 in the step 2-5 are repeated, the purge gas supplied first into the interior space 20 is helium gas. In this case, the purge gas supplied into the interior space 20 at the latest is nitrogen gas. In this manner, the use of different types of purge gas can reduce costs of operations.

The number of times the vacuuming of the interior space 20 and the supply of purge gas into the interior space 20 are repeated may be determined in advance, or may be determined based on the index value indicating the temperature of the submersible pump 2 measured by the purge index measuring device 68. For example, the vacuuming of the interior space 20 and the supply of purge gas into the interior space 20 may be repeated until the index value indicating the temperature of the submersible pump 2 measured by the purge index measuring device 68 exceeds a threshold value.

In step 2-6, the bolts and the nuts (not shown) serving as the purge-container coupling mechanism are removed, and then the hermetic purge container 1, in which the submersible pump 2 is placed, is pulled up by the elevating device 12 and separated from the pump column 3.

In step 2-7, the hermetic purge container 1, in which the submersible pump 2 is placed, is moved away from the pump column 3 by a transporting device (e.g., crane) not shown.

In step 2-8, the upper hermetic lid 23 is removed from the container body 21, and then the submersible pump 2 is removed from the hermetic purge container 1 by a hoisting device (e.g., crane) not shown. At this point, the submersible pump 2 has been already warmed by the purge gas, and has a temperature higher than the boiling point of oxygen (−183° C.) and the boiling point of nitrogen (−196° C.). Therefore, even when the air comes into contact with the submersible pump 2, the oxygen and nitrogen in the air are not liquefied.

Figure 9:
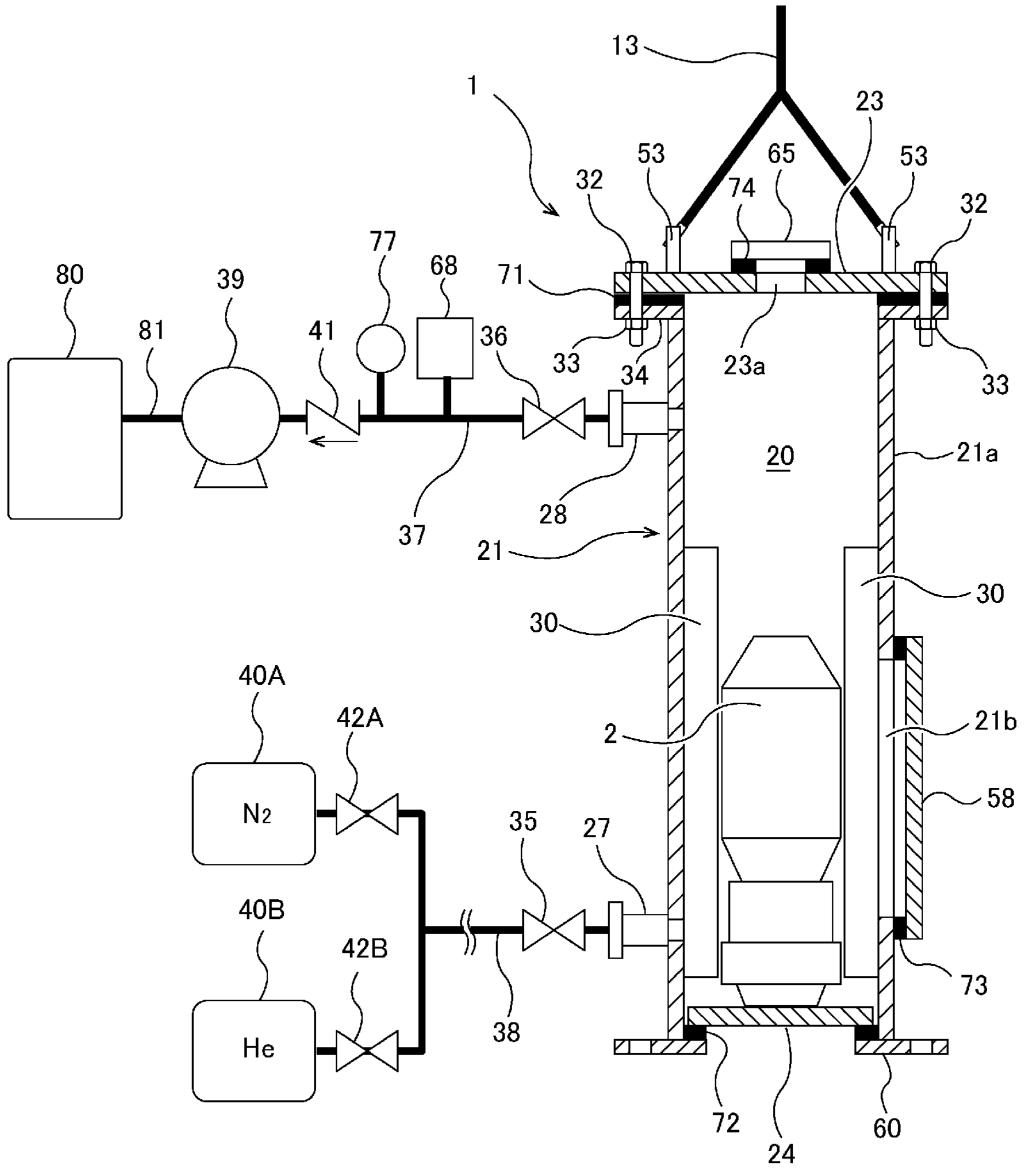
FIG. 9 is a view for illustrating another embodiment of the purge apparatus including the hermetic purge container.

FIG. 9 is a view showing another embodiment of the purge apparatus including the hermetic purge container 1. Configurations of this embodiment, which will not be particularly described, are the same as those of the embodiment described with reference to FIG. 2, and redundant descriptions thereof will be omitted.

The embodiment shown in FIG. 9 further includes a gas treatment device 80 coupled to a downstream side of the vacuum source 39 through a gas delivery line 81. The gas in the interior space 20 is delivered to the gas treatment device 80 through the gas delivery line 81 while the interior space 20 is vacuumed. The gas treatment device 80 is coupled to the gas delivery line 81 at a position downstream of the vacuum source 39. Accordingly, the gas flowing in the vacuum line 37 is sent to the gas treatment device 80 through the vacuum source 39 and the gas delivery line 81. The gas treatment device 80 is a device configured to treat gas (e.g., natural gas, or hydrogen gas) vaporized from the liquefied gas adhering to the submersible pump 2. Examples of the gas treatment devices 80 include a gas incineration device (flaring device), a chemical gas treatment device, and a gas adsorption device.

This embodiment is particularly effective for the processes of pulling up the submersible pump 2 described with reference to FIGS. 6 to 8. According to this embodiment, the gas vaporized from the liquefied gas (e.g., natural gas, or hydrogen gas) is treated by the gas treatment device 80, and thus is not released to the atmosphere.

Figure 10:
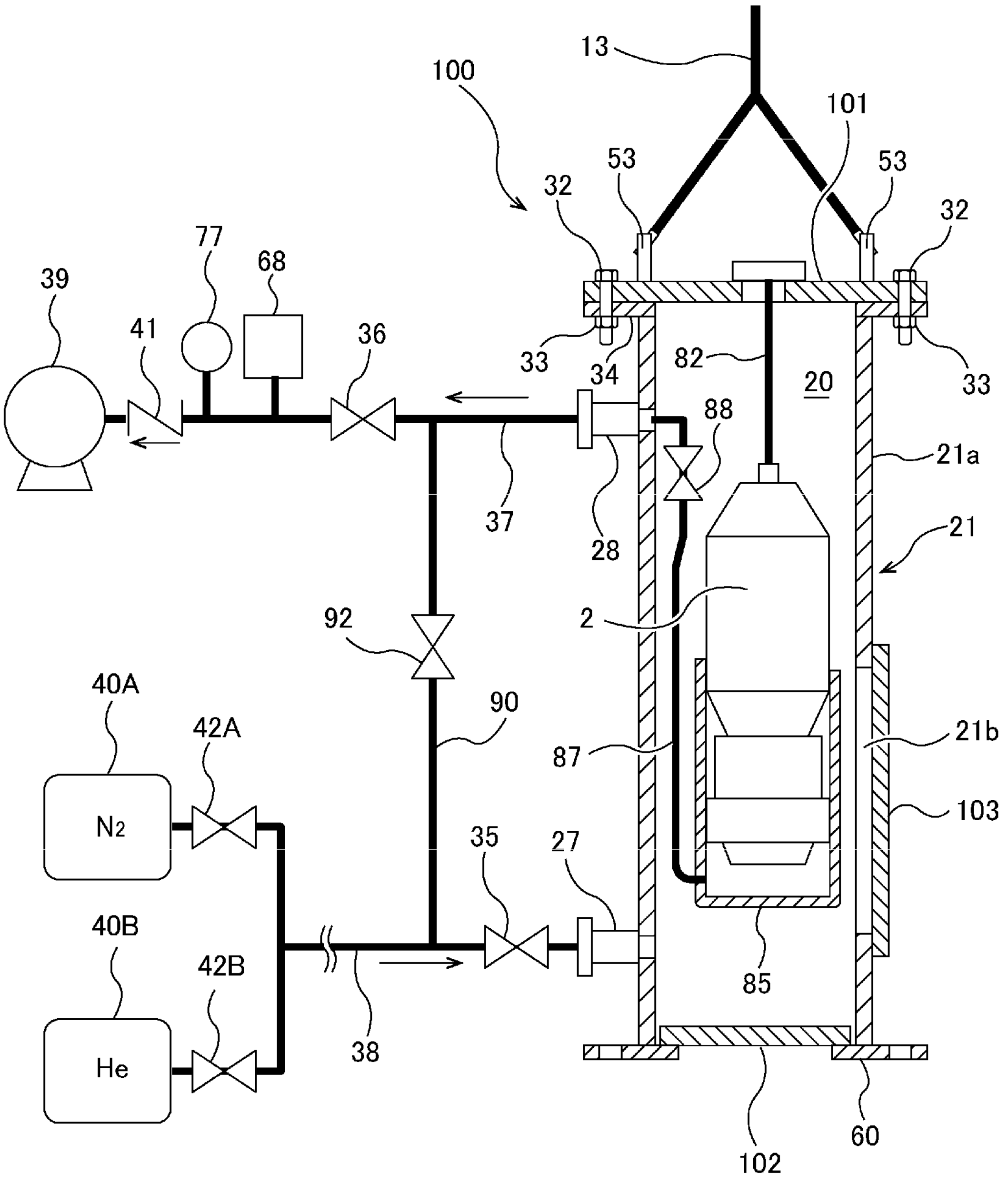
FIG. 10 a view for illustrating still another embodiment of the purge apparatus including the hermetic purge container.

FIG. 10 is a view showing still another embodiment of the purge apparatus including the purge container. Configurations of this embodiment, which will not be particularly described, are the same as those of the embodiment described with reference to FIG. 2, and redundant descriptions thereof will be omitted. In this embodiment, as described below, the purge gas is supplied into the interior space of the submersible pump 2, while the interior space of the submersible pump 2 is vacuumed.

A purge container 100 shown in FIG. 10 is different from the hermetic purge container 1 in each of the embodiments described above in that the purge container 100 is a non-hermetic purge container that does not have the seals 71, 72, and 73. However, the hermetic purge container 1 shown in FIG. 2 may also be used in this embodiment. FIG. 10 illustrates a state in which the submersible pump 2 is placed in the purge container 100. The upper opening of the container body 21 is closed by an upper lid 101, and the lower opening of the container body is closed by a lower lid 102. The submersible pump 2 is suspended from the upper lid 101 by a suspension member 82, and therefore the submersible pump 2 is not in contact with the lower lid 102.

As shown in FIG. 10, the purge apparatus further includes a pump cover 85 configured to close the openings of the submersible pump 2 (i.e., suction port and discharge port), and a pump evacuation line 87 coupled to the pump cover 85. The pump cover 85 is configured to be detachably mounted to the submersible pump 2. The pump evacuation line 87 communicates with an inner side of the pump cover 85. When the pump cover 85 is mounted to the submersible pump 2, an interior space of the submersible pump 2 is sealed, and the pump evacuation line 87 communicates with the sealed interior space of the submersible pump 2. An on-off valve 88 is mounted to the pump evacuation line 87.

The purge apparatus further includes a communication line 90 that provide a fluid communication between the purge-gas supply line 38 and the vacuum line 37, and a second purge-gas supply valve 92 mounted to the communication line 90. A connection point of the purge-gas supply line 38 and the communication line 90 is located upstream of the first purge-gas supply valve 35 in a flow direction of the purge-gas. A connection point of the vacuum line 37 and the communication line 90 is located upstream of the vacuum valve 36 in a flow direction of the purge gas.

When the first purge-gas supply valve 35 and the second purge-gas supply valve 92 are closed and the vacuum valve 36 is opened, the pump evacuation line 87 communicates with the vacuum line 37. Therefore, a vacuum is formed in the interior space of the submersible pump 2. When the first purge-gas supply valve 35 and the vacuum valve 36 are closed and the second purge-gas supply valve 92 is opened, the pump evacuation line 87 communicates with the purge-gas supply line 38. Therefore, the purge gas is supplied into the interior space of the submersible pump 2. When the second purge-gas supply valve 92 and the vacuum valve 36 are closed and the first purge-gas supply valve 35 is opened, the purge-gas supply line 38 communicates with the interior space 20 of the container body 21. Therefore, the purge gas is supplied into the interior space 20 of the container body 21.

In this embodiment, the first purge-gas supply valve 35, the second purge-gas supply valve 92, the communication line 90, and the vacuum valve 36 constitute a switching device that selectively couples the pump evacuation line 87 to one of the vacuum line 37 and the purge-gas supply line 38. However, the switching device is not limited to the configuration of this embodiment, as long as the switching device can selectively couple the pump evacuation line 87 to one of the vacuum line 37 and the purge-gas supply line 38. For example, the switching device may have branch lines which branch off from the vacuum line 37 and the purge gas supply line 38, respectively, and a three-way valve coupled to these branch lines and the pump evacuation line 87.

A method of exposing the submersible pump 2 to the purge gas using the pump cover 85 and the pump evacuation line 87, shown in FIG. 10, is performed as follows.

Figure 11:
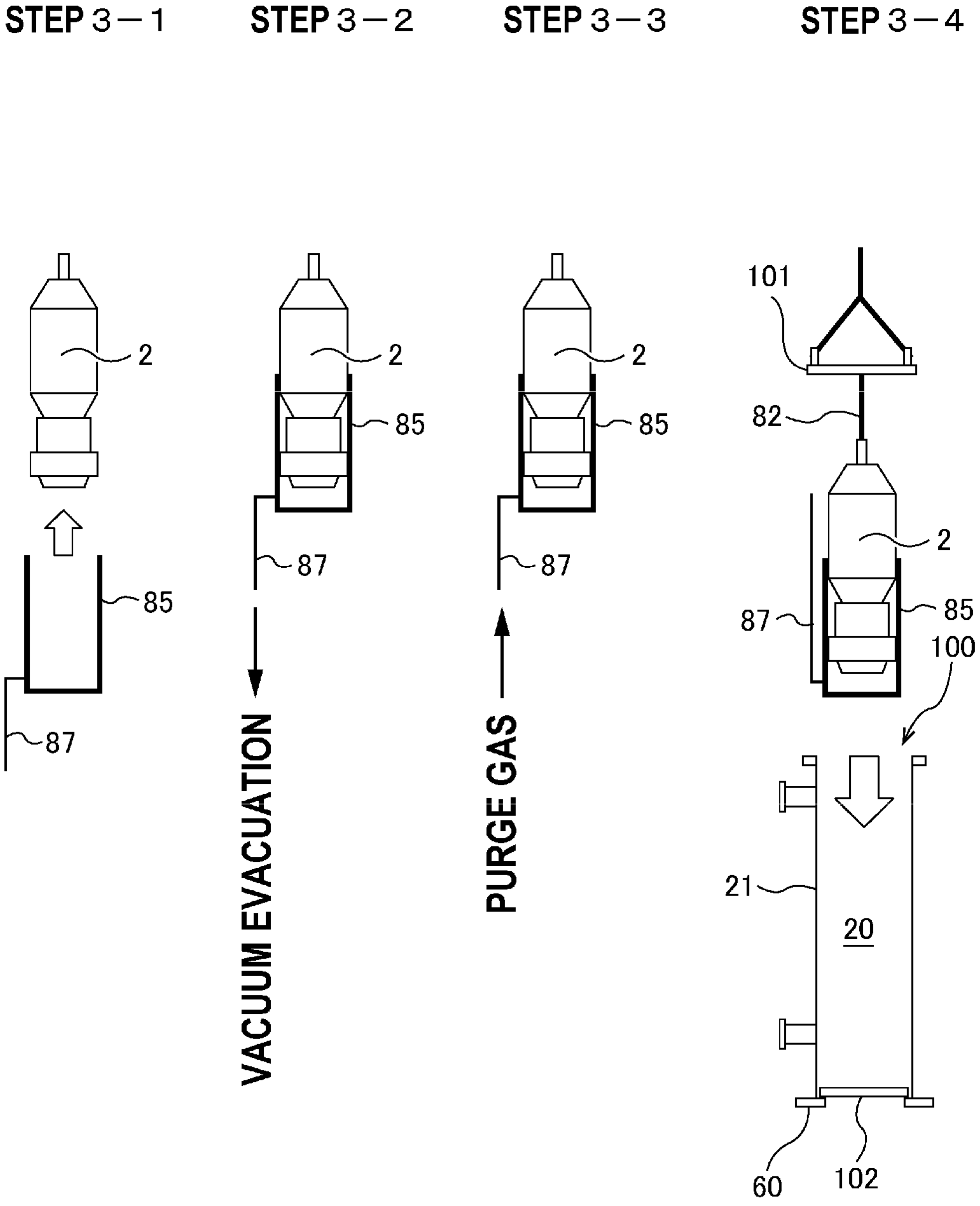
FIG. 11 illustrates an embodiment of a method of exposing the submersible pump to purge gas.

As shown in FIG. 11, in step 3-1, before the submersible pump 2 is moved into the purge container 100, the pump cover 85 to which the pump evacuation line 87 is coupled, is mounted to the submersible pump 2 to thereby close the openings (i.e., suction port and the discharge port) of the submersible pump 2, so that the sealed interior space is formed within the submersible pump 2.

In step 3-2, the pump evacuation line 87 communicates with the vacuum line 37 shown in FIG. 10 to vacuum the sealed interior space of the submersible pump 2. For example, the pump evacuation line 87 may be coupled to the vacuum line 37 through the vacuum-evacuation port 28. Alternatively, the pump evacuation line 87 may be coupled to a branch line (not shown) that branches off from the vacuum line 37.

In step 3-3, the pump evacuation line 87 communicates with the purge-gas supply line 38 shown in FIG. 10 to supply the purge gas (e.g., nitrogen gas, or helium gas) into the interior space of the vacuumed submersible pump 2 (first dry-up operation). For example, the pump evacuation line 87 may be coupled to the purge-gas supply line 38 through the vacuum-evacuation port 28 and the communication line 90. Alternatively, the pump evacuation line 87 may be coupled to a branch line (not shown) that branches off from the purge-gas supply line 38.

In step 3-4, with the pump cover 85, to which the pump evacuation line 87 is coupled, mounted to the submersible pump 2, the submersible pump 2 is moved into the purge container 100 by a transporting device (e.g., a crane) not shown. More specifically, with the submersible pump 2 suspended from the upper lid 101 by the suspension member 82, the submersible pump 2 is moved into the purge container 100. The lower lid 102 is placed on the lower flange 60. When the upper lid 101 is placed on the upper portion of the container body 21, the load of the submersible pump 2 is supported by the upper lid 101.

Figure 12:
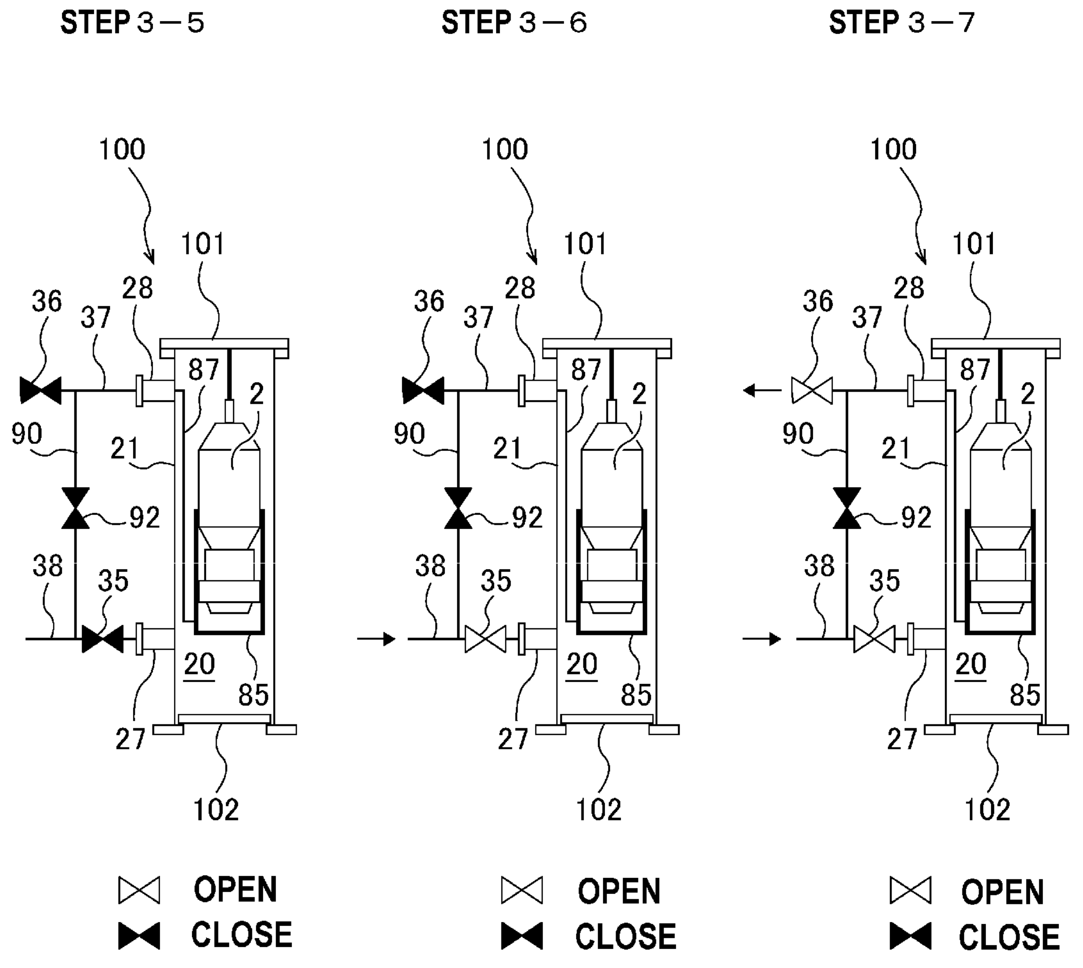
FIG. 12 illustrates an embodiment of a method of exposing the submersible pump to purge gas.

As shown in FIG. 12, in step 3-5, the pump evacuation line 87 is coupled to the vacuum line 37 through the vacuum-evacuation port 28. At this stage, the vacuum valve 36, the first purge-gas supply valve 35, and the second purge-gas supply valve 92 have been closed. In step 3-6, the first purge-gas supply valve 35 is opened, so that the purge gas, such as nitrogen gas or helium gas, is supplied into the interior space 20 of the container body 21 through the purge-gas inlet port 27 to fill the interior space 20. The purge gas expels air and moisture out of the submersible pump 2, so that the outside of the submersible pump 2 is dried (second dry-up operation).

In step 3-7, the vacuum valve 36 is opened to thereby vacuum the sealed interior space of the submersible pump 2 through the vacuum-evacuation port 28 and the pump evacuation line 87.

Figure 13:
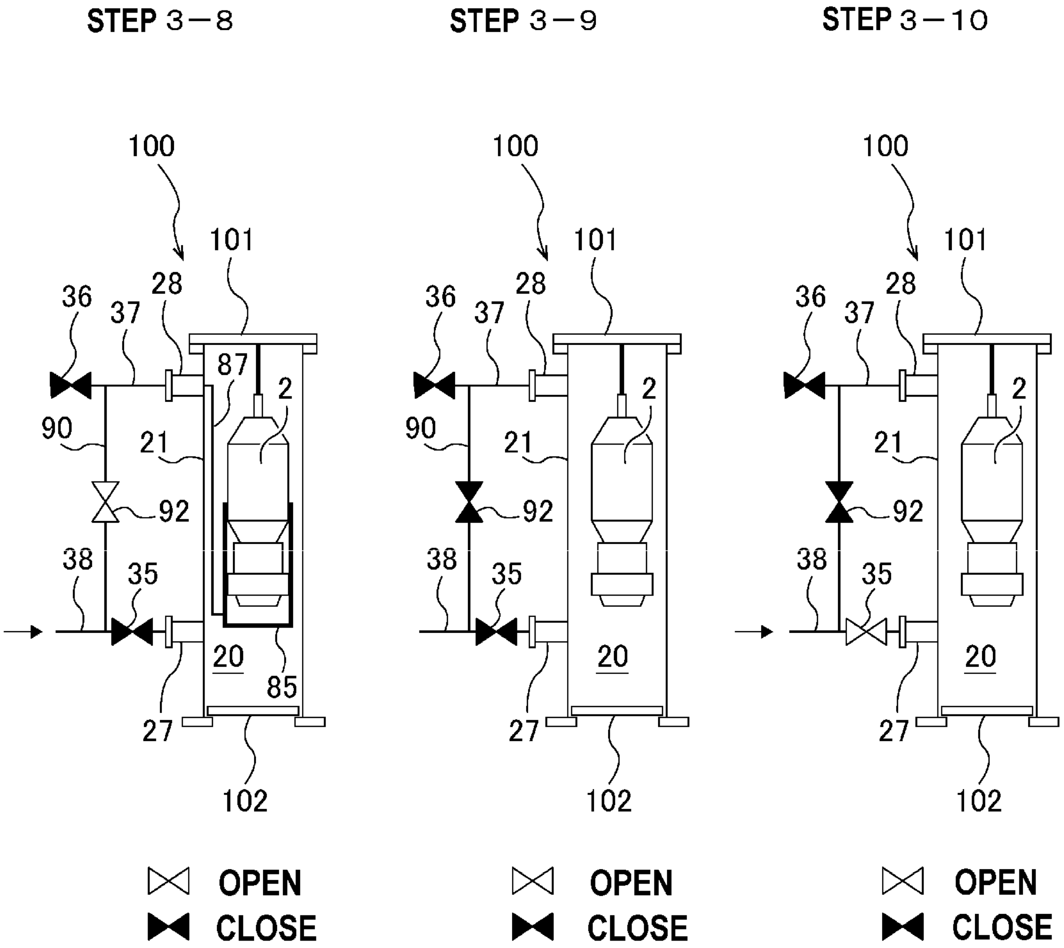
FIG. 13 illustrates an embodiment of a method of exposing the submersible pump to purge gas.

As shown in FIG. 13, in step 3-8, the vacuum valve 36 and the first purge-gas supply valve 35 are closed and the second purge-gas supply valve 92 is opened to thereby supply the purge gas, such as nitrogen gas or helium gas, through the communication line 90 and the vacuum-evacuation port 28 into the interior space of the submersible pump 2. The purge gas expels air and moisture out of the interior space of the submersible pump 2, so that the inside of the submersible pump 2 is dried (third dry-up operation). Either the steps 3-2 and 3-3 described above or the steps 3-7 and 3-8 described above may be omitted.

According to this embodiment, the interior space of the submersible pump 2 is vacuumed and then the purge gas is supplied into the submersible pump 2, so that the inside of the submersible pump 2 can be reliably dried.

In step 3-9, the second purge-gas supply valve 92 is closed, the side lid 103 (see FIG. 10) is removed, and then the pump cover 85 and the pump evacuation line 87 are removed from the interior space 20 of the container body 21.

In step 3-10, the side lid 103 (see FIG. 10) is mounted to the container body 21, and then the first purge-gas supply valve 35 is opened to supply the purge gas, such as nitrogen gas or helium gas, through the purge-gas inlet port 27 into the interior space 20 of the container body 21.

Figure 14:
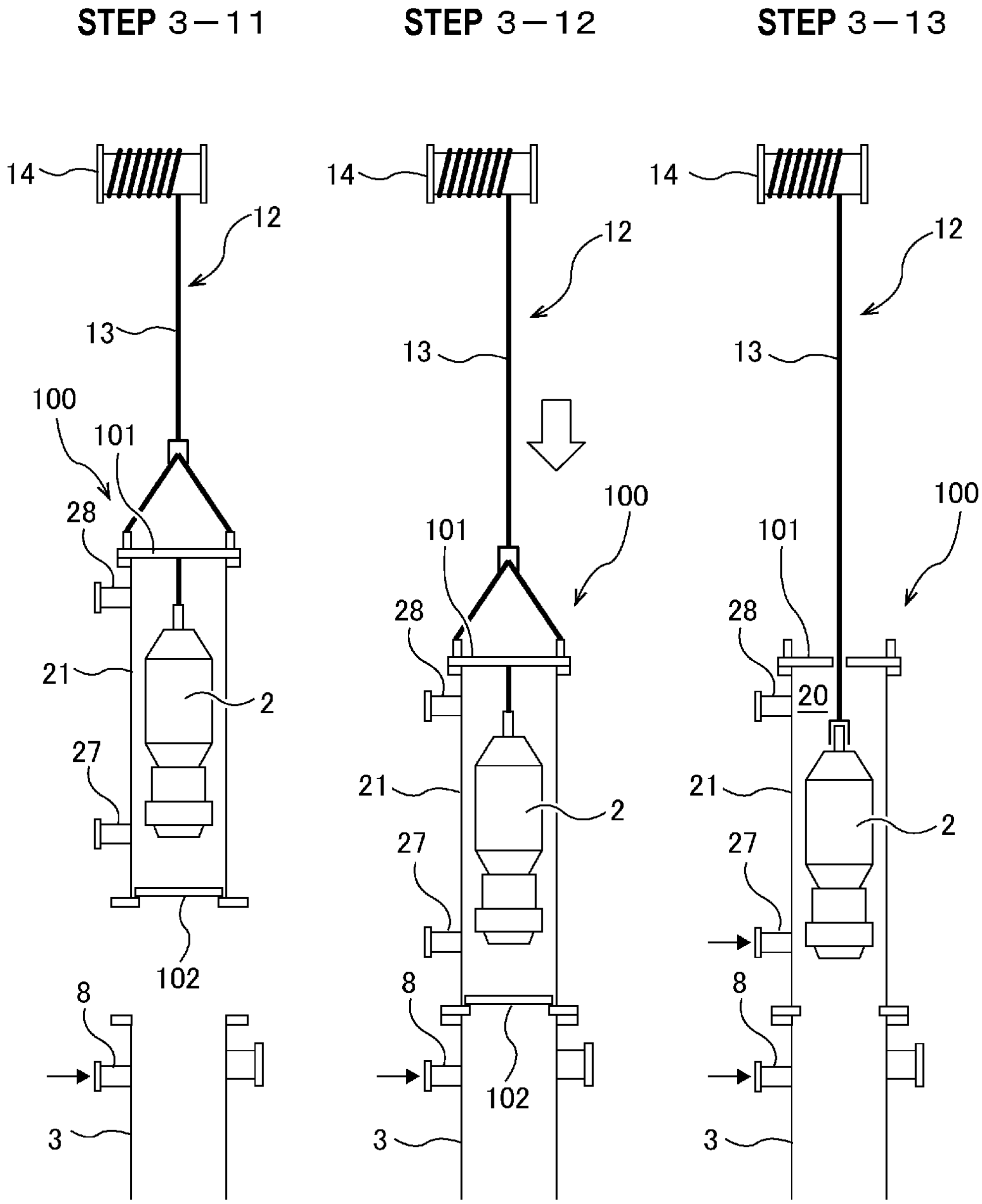
FIG. 14 illustrates an embodiment of a method of exposing the submersible pump to purge gas.

As shown in FIG. 14, in step 3-11, the cable 13 of the elevating device 12 provided above the pump column 3 is coupled to the upper lid 101. The purge container 100 in this embodiment is a transportable purge container which can be transported together with the submersible pump 2 placed therein. The purge container 100 with the submersible pump 2 accommodated therein is suspended by the elevating device 12. In order to prevent ambient air from entering the pump column 3, purge gas (e.g., inert gas, such as nitrogen gas or helium gas) is supplied into the pump column 3 through the purge-gas introduction port 8. The supply of the purge gas into the pump column 3 is continued in the following steps.

In step 3-12, the purge container 100 and the submersible pump 2 are lowered by the elevating device 12, and the purge container 100 is coupled to the upper portion of the pump column 3 by bolts and nuts (not shown) serving as the purge-container coupling mechanism. The purge-container coupling mechanism may be one or more clamps.

In step 3-13, the lower lid 102 is removed from the container body 21 through the side lid 103 (see FIG. 10), and the cable 13 of the elevating device 12 is coupled to the submersible pump 2.

Figure 15:
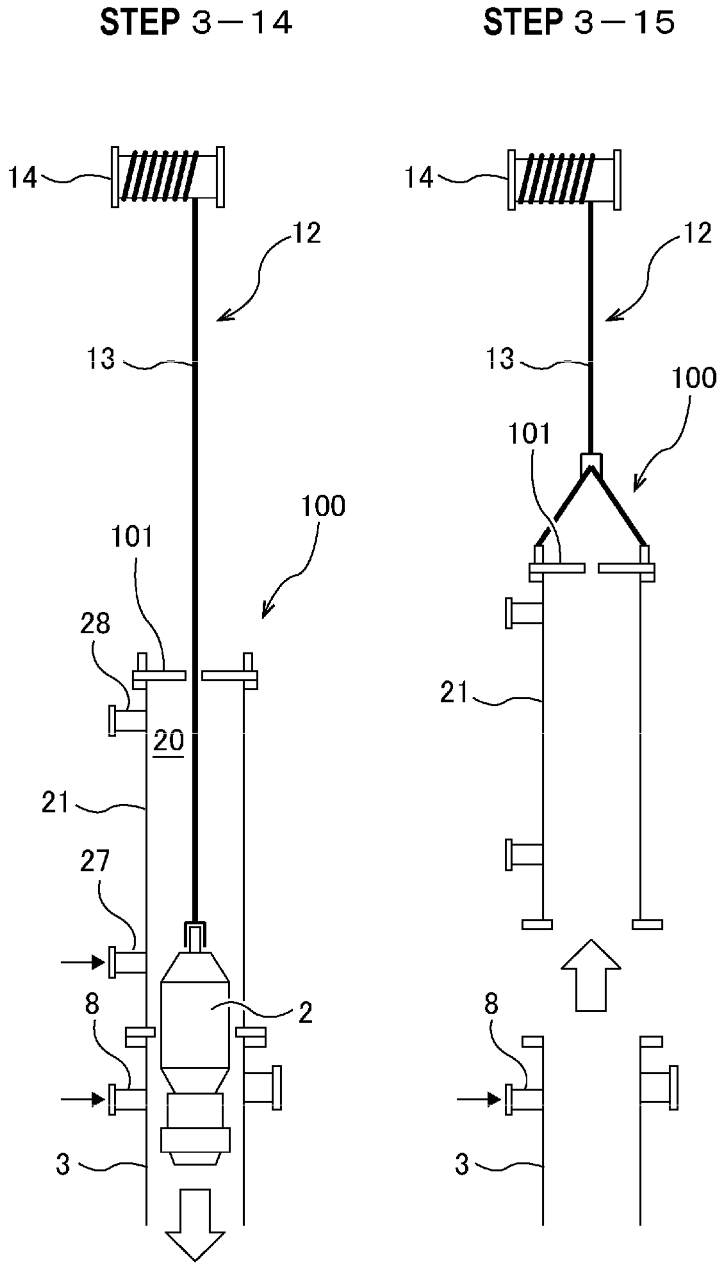
FIG. 15 illustrates an embodiment of a method of exposing the submersible pump to purge gas.
Figure 16:
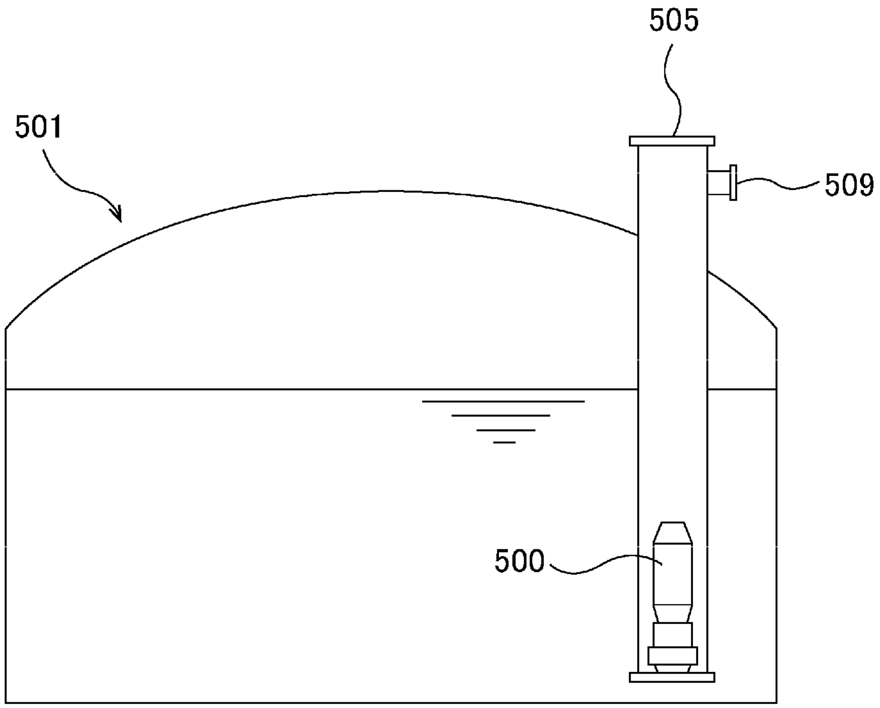
FIG. 16 is a schematic view showing a conventional example of a liquefied-gas storage tank in which liquefied gas is stored and a pump for pumping up the liquefied gas.

As shown in FIG. 15, in step 3-14, the submersible pump 2 is lowered by the elevating device 12, so that the submersible pump 2 is moved from the purge container 100 into the pump column 3. The supply of purge gas into the container body 21 is continued.

In step 3-15, the cable 13 of the elevating device 12 is coupled to the upper lid 101, and the bolts and nuts (not shown) serving as the purge-container coupling mechanism described above are removed. The purge container 100 is then pulled up by the elevating device 12 and separated from the pump column 3.

In this embodiment, steps 3-1 to 3-10 described above are performed before the purge container 100 is coupled to the pump column 3. In one embodiment, after the submersible pump 2 is placed in the purge container 100, the purge container 100 is transported to the pump column 3 together with the submersible pump 2, and the purge container 100 is coupled to the pump column 3, and then the vacuuming of the submersible pump 2 and the supply of purge gas into the submersible pump 2 may be started. More specifically, the dry-up operation for the submersible pump 2 may be started after the purge container 100 is coupled to the pump column 3.

The hermetic purge container 1 and the purge container 100 described with reference to FIGS. 1 to 15 are the transportable purge container that can be moved together with the submersible pump 2 accommodated therein, but the present invention is not limited to these embodiments. In one embodiment, the container body 21 of the hermetic purge container 1 and the container body 21 of the purge container 100 may be secured in advance to the upper portion of the pump column 3 (see FIG. 1). In this case also, the vacuuming of the interior space 20 of the container body 21 and the supply of purge gas into the interior space 20 are performed in the same manner as in the embodiments described above.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a purge apparatus and a purge method for exposing a submersible pump for pressurizing a liquefied gas, such as liquefied ammonia, liquefied natural gas (LNG), or liquid hydrogen, to a purge gas.

REFERENCE SIGNS LIST

1 hermetic purge container
2 submersible pump
3 pump column
5 liquefied-gas storage tank
6 suction valve
8 purge-gas introduction port
9 liquefied-gas discharge port
12 elevating device
13 cable
14 take-up device
20 interior space
21 container body
23 upper hermetic lid
23*a* hole
24 lower hermetic lid
27 purge-gas inlet port
28 vacuum-evacuation port
30 pump guide
32 bolt
33 nut
34 upper flange
35 purge-gas supply valve
36 vacuum valve

37 vacuum line
38 purge-gas supply line
39 vacuum source
40A,40B purge-gas supply source
41 check valve
42A first shutoff valve
42B second shutoff valve
53 coupling ports
58 side lid
60 lower flange
68 purge index measuring device
71 upper seal
72 lower seal
73 side seal
74 second seal
80 gas treatment device
82 suspension member
85 pump cover
87 pump evacuation line
88 on-off valve
90 communication line
92 second purge-gas supply valve
100 purge container
101 upper lid
102 lower lid
103 side lid

What is claimed is:

1. A purge apparatus for exposing a submersible pump to purge gas, the submersible pump being used to deliver liquefied gas, the purge apparatus comprising:

a purge container configured to accommodate the submersible pump therein;

a pump cover configured to close an opening of the submersible pump;

a pump evacuation line coupled to the pump cover;

a vacuum line coupled to a vacuum source;

a purge-gas supply line coupled to a purge-gas supply source; and a switching device configured to selectively couple the pump evacuation line to one of the vacuum line and the purge-gas supply line.

2. The purge apparatus according to claim 1, wherein the purge-gas supply line is coupled to the purge container.

3. The purge apparatus according to claim 1, wherein the vacuum line is coupled to the purge container.

4. A purge method for exposing a submersible pump to a purge gas, the submersible pump being used to deliver liquefied gas, the purge method comprising:

accommodating the submersible pump in an interior space of a hermetic purge container;

vacuuming the interior space in which the submersible pump is accommodated;

supplying purge gas into the vacuumed interior space; and moving the submersible pump from the hermetic purge container into a pump column.

5. The purge method according to claim 4, wherein vacuuming of the interior space and supplying of the purge gas into the vacuumed interior space are repeated.

6. The purge method according to claim 5, wherein the purge gas finally supplied into the interior space is helium gas.

7. The purge method according to claim 6, wherein the purge gas initially supplied into the interior space is nitrogen gas.

8. The purge method according to claim 5, wherein the supplying of purge gas into the vacuumed interior space is started before the vacuuming of the interior space is completed.

9. The purge method according to claim 4, further comprising vacuuming again the interior space, in which the submersible pump is accommodated, to lower a pressure in the interior space to a pressure equal to or less than a target pressure, after supplying the purge gas into the interior space and before moving the submersible pump from the hermetic purge container into the pump column.

10. The purge method according to claim 9, wherein:

the liquefied gas is liquid hydrogen;

the purge gas is nitrogen gas; and the target pressure is expressed by $$Pv = Pa \cdot Vm/(Vc \cdot \rho G/\rho S)$$

where Pv represents the target pressure, Pa represents atmospheric pressure, Vm represents a preset constant, Vc represents a volume of the interior space, ρG represents a density of nitrogen gas, and ρS represents a density of solid nitrogen.

11. The purge method according to claim 10, wherein the preset constant Vm is a maximum volume of ice that the submersible pump can be operated in the interior space under a condition where the ice has been precipitated in the interior space.

12. A purge method for exposing a submersible pump to a purge gas, the submersible pump being used to deliver liquefied gas, the purge method comprising:

pulling up the submersible pump out of the pump column;

accommodating the submersible pump in an interior space of a hermetic purge container;

vacuuming the interior space in which the submersible pump is accommodated; and supplying the purge gas into the vacuumed interior space.

13. The purge method according to claim 12, wherein vacuuming of the interior space and supplying of the purge gas into the vacuumed interior space are repeated.

14. The purge method according to claim 13, wherein the purge gas initially supplied into the interior space is helium gas.

15. The purge method according to claim 14, wherein the purge gas finally supplied into the interior space is nitrogen gas.

16. The purge method according to claim 12, wherein the supplying of purge gas into the vacuumed interior space is started before the vacuuming of the interior space is completed.

17. The purge method according to claim 12, wherein gas in the interior space is delivered to a gas treatment device through a vacuum line while vacuuming the interior space.

18. A purge method for exposing a submersible pump to a purge gas, the submersible pump being used to deliver liquefied gas, the purge method comprising:

closing an opening of the submersible pump with a pump cover;

vacuuming an interior space of the submersible pump; and supplying the purge gas into the vacuumed interior space of the submersible pump.

19. The purge method according to claim 18, further comprising accommodating the submersible pump in a purge container and supplying purge gas into an interior space of the purge container before vacuuming the interior space of the submersible pump.

20. The purge method according to claim 18, further comprising accommodating the submersible pump in a purge container and supplying purge gas into an interior space of the purge container after supplying the purge gas into the interior space.

* * * * *